(12) United States Patent
Berger et al.

(10) Patent No.: US 8,958,741 B2
(45) Date of Patent: Feb. 17, 2015

(54) EDUCATION MONITORING

(75) Inventors: Lawrence Jason Berger, New York, NY (US); Laurence Holt, Brooklyn, NY (US); Michael Kasloff, Maplewood, NJ (US)

(73) Assignee: Amplify Education, Inc., New York, NY (US)

( * ) Notice: Subject to any disclaimer, the term of this patent is extended or adjusted under 35 U.S.C. 154(b) by 183 days.

(21) Appl. No.: 12/877,681

(22) Filed: Sep. 8, 2010

(65) Prior Publication Data

US 2011/0117534 A1    May 19, 2011

Related U.S. Application Data

(60) Provisional application No. 61/240,504, filed on Sep. 8, 2009.

(51) Int. Cl.
*G09B 7/00* (2006.01)
*G09B 7/08* (2006.01)
*G09B 5/08* (2006.01)
*G09B 7/02* (2006.01)

(52) U.S. Cl.
CPC ... *G09B 5/08* (2013.01); *G09B 7/02* (2013.01)
USPC ........... 434/350; 434/219; 434/323; 705/321; 705/326; 715/750

(58) Field of Classification Search
USPC ........................................................ 434/350
See application file for complete search history.

(56) References Cited

U.S. PATENT DOCUMENTS

| | | | |
|---|---|---|---|
| 6,915,104 B2 * | 7/2005 | Yonezu et al. | 434/350 |
| 7,013,325 B1 * | 3/2006 | Vivian et al. | 709/203 |
| 7,063,536 B1 * | 6/2006 | Fustolo | 434/323 |
| 7,568,160 B2 * | 7/2009 | Berger et al. | 715/750 |
| 7,912,900 B1 * | 3/2011 | Lippert et al. | 709/204 |
| 7,922,494 B2 * | 4/2011 | Banerjee et al. | 434/323 |
| 8,137,112 B2 | 3/2012 | Woolf | |
| 8,182,270 B2 * | 5/2012 | Elzinga et al. | 434/322 |
| 2004/0033475 A1 * | 2/2004 | Mizuma et al. | 434/219 |
| 2005/0240561 A1 * | 10/2005 | Jain et al. | 707/1 |
| 2006/0040248 A1 * | 2/2006 | Aaron | 434/362 |
| 2006/0154226 A1 * | 7/2006 | Maxfield | 434/323 |
| 2008/0261191 A1 * | 10/2008 | Woolf et al. | 434/323 |
| 2011/0161238 A1 * | 6/2011 | Fitterer et al. | 705/321 |

OTHER PUBLICATIONS

PCT Notification of Transmittal of the International Search Report and the Written Opinion of the International Searching Authority for International Application No. PCT/US2010/048152 mailed Oct. 25, 2010 (10 pages).

Office Action issued in U.S. Appl. No. 14/160,943 on Apr. 17, 2014, 18 pages.

* cited by examiner

*Primary Examiner* — Xuan Thai
*Assistant Examiner* — James Hull
(74) *Attorney, Agent, or Firm* — Fish & Richardson P.C.

(57) ABSTRACT

Group-based, periodic education intervention that provides a targeted curriculum selected specifically for each period based on current skill assessment data is described. For example, candidates' skill levels in multiple skills are assessed, and groups are formed based on commonality of skill level. A period-specific curriculum is generated for each group to address the specific needs of the individuals of the respective group. After delivery of the period-specific targeted curriculum over the period, re-assessments of the current skill of the group members are made, and a period-specific curriculum for the subsequent period is generated and delivered. Fidelity of an implementation of the curriculum is analyzed, and alerts, reminders, and reports are provided to improve fidelity of an implementation of the curriculum.

28 Claims, 14 Drawing Sheets

FIG. 8

ⓐ This student has not acquired a skill that the rest of the group has acquired. Since this Burst group has moved on to other skills, additional instruction on the marked skill is recommended.
ⓑ This Benchmark student has acquired the skills being taught in this Burst. You may want to remove this student from the group by clicking the "Edit Group" button.

Request New Burst Instruction

[Create Burst #2]  ⚠ Create a new Burst when the table shows updated mCLASS:DIBELS Progress Monitoring data for PSF and NWF.
  985

CURRENT DATA as of yesterday                                          ▽ Key

| Students | PSF | NWF | Phonol. Aware | Letter Sounds | Blending | Reg. Words | Irreg. Words | Letter Combos | Adv. Phonics | Reading Fluency |
|---|---|---|---|---|---|---|---|---|---|---|
| 🔒 Cote, Barrett | | | ⊖ | ⊖ | ⊚ | ⊚ | | | | |
| 🔒 Delaney, Alexis | | | ⊖ | ⊖ | ○ | ⊖ | | | | |
| 🔒 Edwards, Austin | | Feb 15 | ⊖ | ⊖ | ⊖ | ○ | | | | |
| 🔒 Michelson, Shawn | Feb 14 | Feb 15 | ⊚ | ⊚ | ⊚ | ⊚ | | | | |

The Burst

Here's an example of what is included with each 10-day Burst, illustrating the overview, lesson detail and the type of progression that could be seen from Day 1 to Day 10 of a Burst that's designed to focus on two skills for a sample group.

*Every Burst is customized specifically for a single group of students, highlighting the two focus skills and key probes to use for progress monitoring*

Waters Group 1 Burst #2 —1011
10 day lesson plan (30 minutes per day)

Linda Waters
Created 5/8/08

Students
Alexis D, Austin E, Barrett C, Shawn M
1012

Skills —1013
Phonological Awareness
Letter Sounds

Progress Monitor: PSF, NWF
* Your progress monitoring day can be anytime from day 7-10. Sync your results no later than day 10 so you can request a new Burst and stay on schedule.

*The precise sequence of lessons that will be taught over the 10-day period.*

Day 1                                                          1006 — Day 6
A  Silly Sentences: Partial Phoneme Segmenting        A  Introduce Last Sound Segmenting (ant, bag,
B  Introduce Phoneme Segmenting (fit, ham,                    egg ... Van)
    mad ... sit)                                              B  How Many Sounds? Phoneme Segmenting Accuracy
C  Introduce v  —1001                                             (back ... time)
D  Letter Sound Accuracy (/a/... /b/, /n/, c /k/,         C  Reintroduce h
    /k/, /v/)                                                 D  Letter Sound Accuracy (/a/... /n/, c /k/, /k/, /v/ /h/)
E  Apply the Skill: Say it, Move it                       E  Apply the Skill: Catch it! Letter Sounds

Day 2                                                          Day 7 *
A  Squeeze: Phoneme Blending Accuracy (bag,             A  First Sound Segmenting Accuracy (egg, horse,
    bed, cat .... well)                                         igloo ... zipper)
B  Phoneme Segmenting Accuracy (bad, fan,               B  Last Sound Segmenting Accuracy (bed, box,
    fit ... Tim)                                                door ... star)
C  Introduce l  —1002                                     C  Introduce w  —1007
D  Let Me Introduce Myself: Letter Sound (/a/...          D  Letter Sound Fluency (/a/... /n/, c /k/, /k/, /v/ /h/)
    /n/, c /k/, /k/, /v/, /l/)                                E  Apply the Skill: First Sound Memory
E  Apply the Skill : Letter Sounds Egg Carton
    Game

FIG. 10

Day 3

A Phoneme Blending Accuracy (bag, cut, dig ... pit)
B Phoneme Segmenting Accuracy (cut, fish, grape ... wash)
C Reintroduce v  ⟶ 1003
D Letter Sound Fluency (/a/... /b/, /n/, c /k/, /k/, /v/)
E Apply the Skill : Say it, Move it Day 4

A Walk it Out: Phoneme Segmenting Accuracy (can, cub, doll ... tub)
B Introduce First Sound Segmenting (alligator, banana, cow ... umbrella)
C Reintroduce l  ⟶ 1004
D Letter Hunt: Letter Sound Accuracy (/a/... /b/, /n/, c /k/, /k/, /v/)
E Apply the Skill : Letter Sounds Egg Carton Game Day 5

A Phoneme Blending Accuracy (coat, dice, gate ... wave)
B First Sound Segmenting Accuracy (apple, bird, fish ... volcano)
C Introduce h  ⟶ 1005
D Letter Sound Fluency (/a/... /b/, /n/, c /k/, /k/, /v/)
E Apply the Skill: First Sound Memory Day 8 *

A First Sound Segmenting Accuracy (banana, fish, hand ... zebra)
B Last Sound Segmenting Accuracy (elephant, elk, fire ... watch)
C Reintroduce w  ⟶ 1008
D Let Me Introduce Myself: Letter Sound Accuracy (/a/... /k/, /v/ /h/, /w/)
E Apply the Skill: Catch it! Letter Sounds Day 9 *

A First Sound Segmenting Accuracy (cow, girl, hand ... zipper)
B Introduce Middle Sound Segmenting (bed, cat, up, ... van)
C Introduce j  ⟶ 1009
D Letter Sound Fluency: Student-led (/a/... c /k/, /k/ /v/, /h/, /w/)
E Apply the Skill: Last Sound Tic Tac Toe Day 10 *

Progress Monitor: PSF, ISF  ⟶ 1010
Choose activities from earlier lessons for review and reinforcement.

The overview page provides a 10-day road map.

FIG. 10 (Cont.)

EDUCATION MONITORING

RELATED APPLICATIONS

This patent application is related to, and claims priority to and the full benefit of, U.S. provisional patent application Ser. No. 61/240,504 filed Sep. 8, 2009, and titled "Education Monitoring," which is incorporated herein in its entirety.

FIELD

This document relates to monitoring education.

BACKGROUND

In a group education setting, different individuals may learn different skills or attain knowledge at different rates. Individuals who struggle to acquire a particular skill, or knowledge of a particular topic compared to their peers' ability to acquire the particular skill or knowledge of the particular topic may benefit from different instruction methods and/or materials than the methods and materials that are effective for their peers. Similarly, individuals who excel at acquiring a particular skill or knowledge may benefit from different instruction methods and/or material. Accordingly, individuals who are not learning one or more skills at a comparable rate as their peers, or above or below a desired rate, may be identified for different and/or additional instruction in an effort to help the individual attain the skill or skills they lack or to help the individual attain greater proficiency or new skills and/or knowledge of new topics. Individuals that lack a skill or that excel can be identified through the insight of an instructor or supervisor or the individual can be assessed through tests or other assessment tools. Once identified, an individual can be targeted for specific education intervention. Thus, some students, such as students who are in need of extra help or talented and gifted (TAG) students, may require or benefit from different and/or additional instruction than that provided to their peers.

Particularly in such specialized instructional settings, though also in other educational settings, review of instructor and/or student performance to ensure faithful qualitative and quantitative implementation of a curriculum can help ensure that the benefits of the instruction are achieved. Such review can allow verification that one or more aspects of the curriculum is, or is not, being performed, and may allow a supervisor or administrator to determine a level of quality or completeness of the instruction of the curriculum. This information can be used to generate feedback to the instructor and/or the student to improve or maintain instruction effectiveness.

SUMMARY

In one general aspect, a system for ensuring fidelity to a model implementation of an educational process includes one or more processing devices, one or more communication devices, and one or more storage devices storing instructions that, when executed by the one or more processing devices, cause the one or more processing devices to: perform operations included in an implementation of the educational process, wherein the model implementation of the educational process includes at least the following operations: receive, via the one or more communication devices, first assessments of a skill level of candidates for at least one skill, group a subset of the candidates into an instructional group based, at least in part, on the first assessments, generate a first set of instructional materials for teaching the at least one skill, store the first set of instructional materials on the one or more storage devices, receive, via the one or more communication devices, a request for the first set of instructional materials from a user, provide, via the one or more communication devices, the first set of instructional materials to the user, receive, via the one or more communication devices, second assessments of the skill level of instructional group members for the at least one skill, generate a second set of instructional materials for teaching the at least one skill, store the second set of instructional materials on the one or more storage devices, receive, via the one or more communication devices, a request for the second set of instructional materials from the user, and provide, via the one or more communication devices, the second set of instructional materials to the user, determine values for one or more fidelity factors, the fidelity factors relating to a degree of conformity between the model implementation of the educational process and the implementation of the educational process, determine a fidelity level based on the one or more determined fidelity factors, compare the fidelity level to a threshold level, and generate a fidelity alert message if the fidelity level exceeds the threshold level.

Implementations can include one or more of the following features. For example, the instructions may include instructions that, when executed by the one or more processing devices, cause the one or more processing devices to transmit the alert message to one or more of a teacher, an administrator, or a parent. The fidelity level may indicate a fidelity of the implementation of the educational process to the model implementation of the educational process. The alert message may include one or more recommendations regarding modification of the implementation of the education process to align the implementation to the model implementation. The alert message may provide feedback regarding adequate and inadequate aspects of the implementation of the educational process. The alert message may include a reminder regarding upcoming milestones related to the first and second sets of instructional materials. The subset of candidates may be grouped such that members of the instructional group have similar skill levels with respect to the at least one skill. The similar skill levels of the members of the instructional group may include a deficiency in the at least one skill. Determining values for one or more fidelity factors may include determining a value for a fidelity factor that relates to at least one of the request for the first set of instructional materials, the receipt of the second assessments, or the request for the second set of instructional materials. Determining values for one or more fidelity factors may include determining a value for a fidelity factor that relates to one or more of the following: (1) an amount of time elapsed since the first set of instructional materials was provided to the user until receiving the request for the second set of instructional materials from the user, (2) an amount of time the first set of instructional materials were administered to one or more members of the instructional group, (3) an amount of time elapsed since the first set of instructional materials was provided to the user until receiving the second assessments of the skill level of instructional group members for the at least one skill, or (4) a progress of one or more of the instructional group members determined based on the received second assessments. Determining values for one or more fidelity factors may include determining a fidelity factor that relates to at least one of a lesson delivery start time, a lesson delivery completeness, or a student interaction during a lesson.

In another general aspect, a system for ensuring fidelity of instructional materials includes one or more processing devices, one or more communication devices, and one or more storage devices storing instructions that, when executed by the one or more processing devices, cause the one or more processing devices to: monitor fidelity of an implementation of an educational process by generating a fidelity factor value that relates to a degree of conformity between the educational process and an aspect of the implementation, and comparing the fidelity factor value with a predetermined threshold value, and generate an alert message when the comparison indicates that the implementation of the process deviates from the educational process by more than a predetermined amount, the alert message including at least one of information regarding the deviation or a recommendation or instruction to remedy the deviation.

Implementations can include one or more of the following features. For example, the fidelity factor value may relate to at least one of the request for the first set of instructional materials, the receipt of the second assessments, or the request for the second set of instructional materials. The fidelity factor value may relate to one or more of the following: (1) an amount of time elapsed since the first set of instructional materials was provided to the user until receiving the request for the second set of instructional materials from the user, (2) an amount of time the first set of instructional materials were administered to one or more members of the instructional group, (3) an amount of time elapsed since the first set of instructional materials was provided to the user until receiving the second assessments of the skill level of instructional group members for the at least one skill, or (4) a progress of one or more of the instructional group members determined based on the received second assessments. The fidelity factor value may relate to at least one of a lesson delivery start time, a lesson delivery completeness, or a student interaction during a lesson.

In another general aspect, a computer-implemented method for ensuring fidelity to a model implementation of an educational process includes executing one or more instructions that, when executed by one or more processing devices, cause the one or more processing devices to: perform operations included in an implementation of the educational process, wherein the model implementation of the educational process includes at least the following operations: receive, via one or more communication devices, first assessments of a skill level of candidates for at least one skill, group a subset of the candidates into an instructional group based, at least in part, on the first assessments, generate a first set of instructional materials for teaching the at least one skill, store the first set of instructional materials on the one or more storage devices, receive, via the one or more communication devices, a request for the first set of instructional materials from a user, provide, via the one or more communication devices, the first set of instructional materials to the user, receive, via the one or more communication devices, second assessments of the skill level of instructional group members for the at least one skill, generate a second set of instructional materials for teaching the at least one skill, store the second set of instructional materials on the one or more storage devices, receive, via the one or more communication devices, a request for the second set of instructional materials from the user, and provide, via the one or more communication devices, the second set of instructional materials to the user, determine values for one or more fidelity factors, the fidelity factors relating to a degree of conformity between the model implementation of the educational process and the implementation of the educational process, determine a fidelity level based on the one or more determined fidelity factors, compare the fidelity level to a threshold level, and generate a fidelity alert message if the fidelity level exceeds the threshold level.

Implementations can include one or more of the following features. For example, the instructions may include instructions that, when executed by the one or more processing devices, cause the one or more processing devices to transmit the alert message to one or more of a teacher, an administrator, or a parent. The fidelity level may indicate a fidelity of the implementation of the educational process to the model implementation of the educational process. The alert message may include one or more recommendations regarding modification of the implementation of the educational process to align the implementation of the educational process with the model implementation of the educational process. The alert message may provide feedback regarding adequate and inadequate aspects of the implementation of the process. The alert message may include a reminder regarding upcoming milestones related to the first and second sets of instructional materials. The subset of candidates may be grouped such that members of the instructional group have similar skill levels with respect to the at least one skill. The similar skill levels of the members of the instructional group may include a deficiency in the at least one skill. Determining values for one or more fidelity factors may include determining a value for a fidelity factor that relates to at least one of the request for the first set of instructional materials, the receipt of the second assessments, or the request for the second set of instructional materials. Determining values for one or more fidelity factors may include determining a value for a fidelity factor that relates to one or more of the following: (1) an amount of time elapsed since the first set of instructional materials was provided to the user until receiving the request for the second set of instructional materials from the user, (2) an amount of time the first set of instructional materials were administered to one or more members of the instructional group, (3) an amount of time elapsed since the first set of instructional materials was provided to the user until receiving the second assessments of the skill level of instructional group members for the at least one skill, or (4) a progress of one or more of the instructional group members determined based on the received second assessments. Determining values for one or more fidelity factors may include determining a fidelity factor that relates to at least one of a lesson delivery start time, a lesson delivery completeness, or a student interaction during a lesson.

In another general aspect, a computer-implemented method for ensuring fidelity of instructional materials includes executing one or more instructions that, when executed by one or more processing devices, cause the one or more processing devices to: monitor fidelity of an implementation of an educational process by generating a fidelity factor value that relates to a degree of conformity between the educational process and an aspect of the implementation, and comparing the fidelity factor value with a predetermined threshold value, and generate an alert message when the comparison indicates that the implementation of the process deviates from the educational process by more than a predetermined amount, the alert message including at least one of information regarding the deviation or a recommendation or instruction to remedy the deviation.

Implementations can include one or more of the following features. For example, the fidelity factor value may relate to at least one of the request for the first set of instructional materials, the receipt of the second assessments, or the request for the second set of instructional materials. The fidelity factor value may relate to one or more of the following: (1) an amount of time elapsed since the first set of instructional materials was provided to the user until receiving the request for the second set of instructional materials from the user, (2)

an amount of time the first set of instructional materials were administered to one or more members of the instructional group, (3) an amount of time elapsed since the first set of instructional materials was provided to the user until receiving the second assessments of the skill level of instructional group members for the at least one skill, or (4) a progress of one or more of the instructional group members determined based on the received second assessments. The fidelity factor value may relate at least one of a lesson delivery start time, a lesson delivery completeness, or a student interaction during a lesson.

The details of one or more implementations are set forth in the accompanying drawings and the description below. Other features will be apparent from the description and drawings, and from the claims.

DESCRIPTION OF THE DRAWINGS

FIG. 8 is a diagram of an example of a graphical user interface for creating an education intervention curriculum.

FIG. 10 is an illustration of an example of an overview of a customized curriculum.

DETAILED DESCRIPTION

For many reasons, including practicalities of administration and cost management, formal education, along with many other types of instruction, is generally conducted on a group basis. In a common model, an instructor, such as a classroom teacher, with or without the assistance of an aide or a specialist teacher, presents a predetermined curriculum to a group of students, optionally with deviation or variation selected by the instructor. For example, the group may include 20 individuals, and most or all individuals may be in attendance for each class or instructional session. In many instances, some individuals of the group will acquire some skills and/or knowledge faster than other individuals, and indeed, faster than anticipated for a hypothetical average individual. Similarly, some individuals will acquire those skills and/or knowledge slower than anticipated.

Observed rates of acquisition of skills or knowledge for the individuals may relate, at least in part, to the curriculum and/or the method of presentation of the curriculum. Accordingly, to assist individuals who demonstrate a deficiency in a skill or in knowledge of a topic, a different curriculum and/or a different method of presentation of the curriculum can be implemented. The different curriculum and/or different method of presentation of the curriculum can be associated with an education intervention that attempts to remediate an individual's skill and/or knowledge deficiency resulting from slow acquisition of the skill and/or knowledge. Similarly, for those who excel, a different curriculum and/or method of presentation of the curriculum can be implemented to take advantage of the individual's aptitude to further improve the individual's skill and/or knowledge, and to include more advanced topics and skills.

Figure 1:
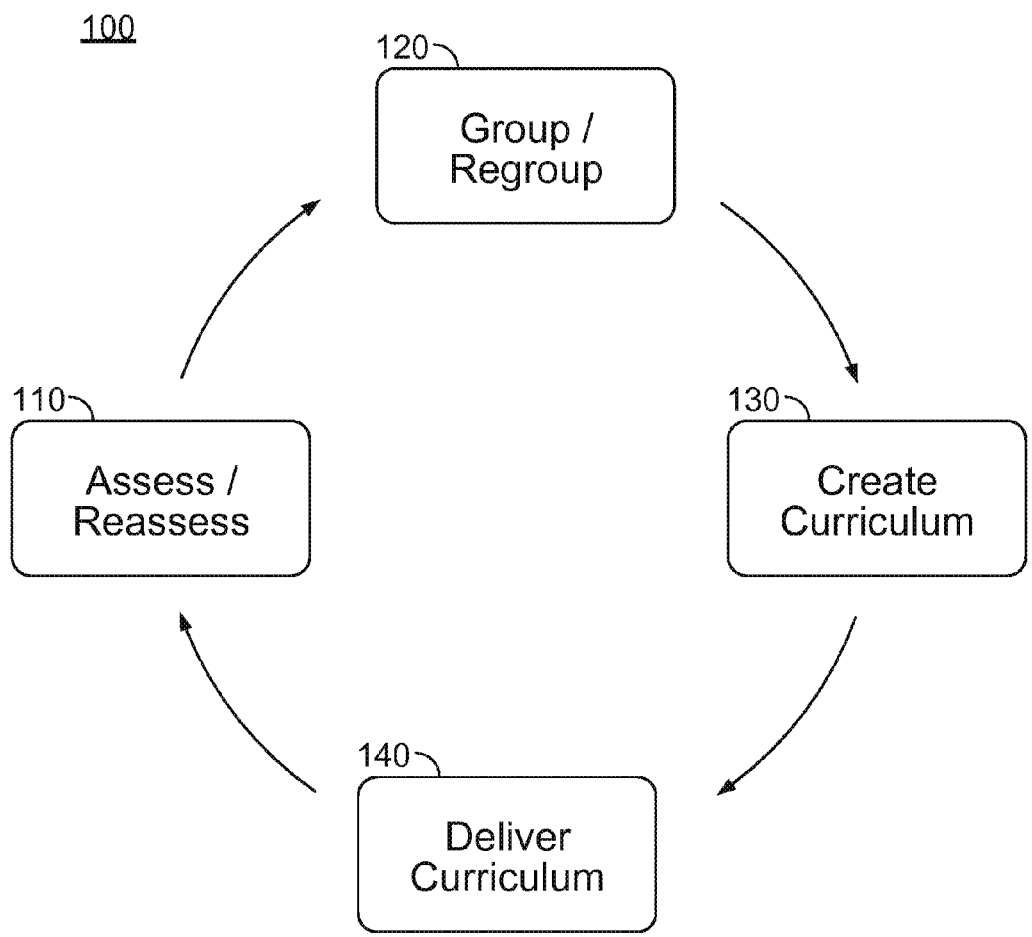
FIG. 1 is a flow chart of an example of a process for education intervention.

The flow chart of FIG. 1 illustrates an example of a process 100 that may be used for remedial education intervention. The process 100, or a similar process, can also be used for advanced education intervention. The process 100 includes assessing candidates' skill level or knowledge level (110) for at least one skill or topic of knowledge to determine whether each candidate's skill level or knowledge level is at, above, or below, an anticipated level or a desired level. The anticipated or desired level may be based on a theoretical average candidate, a standardized level for a category of candidates, or based on a comparison with the other candidates' levels, such as by comparing a rank of a particular candidate with ranks of other candidates, or by comparing a candidate's level to an average of all the candidates' levels. For example, the skill level of each student in a selected grade can be assessed for one or more selected skill(s), such as reading comprehension or for knowledge of one or more topic(s). For each student, the reading comprehension skill level indicated by the assessment can be compared to a predetermined skill level for students in the selected grade, such as a predetermined skill level at which a student is deemed to be proficient or as having attained a minimum acceptable skill level, or another predetermined skill level for reading comprehension. In another example, a Bayesian network can be used to weigh the probability, based on several inputs, that a student is above a certain likelihood of needing, or not needing, intervention for a specific skill.

Based on the assessments of the candidates, one or more groups can be formed from among the candidates (120). In some implementations, the groups are formed by identifying two or more candidates whose assessments indicate a similar or identical skill level for a particular skill or topic of knowledge. In the example above, where students of the selected grade are assessed for reading comprehension skill level, the students for whom the assessment indicates the lowest reading comprehension skill level, such as a reading comprehension skill level below a predetermined minimum acceptable reading comprehension skill level, can be added to a first group. Other students with reading comprehension skill levels similar to each other may be grouped in a second group, if desired, such as where the assessments of the students in the second group indicate a deficient reading comprehension skill level, but not the lowest skill level. In another example, students for whom the assessment indicates a skill and/or knowledge deficiency can be grouped together, whereby students with different ability levels are grouped together due to a deficiency in a common skill. This may allow some students to help other group members learn the skills and/or knowledge for which they have higher skill or knowledge levels. Students may also be grouped in this way using two or more skills, or a particular combination of skills. Additionally, two or more groups can be formed from the students with the lowest reading comprehension skill level, such as where a group size is limited and more than the maximum allowed number of students per group were assessed at the lowest reading comprehension skill level. Different groups of students with the same skill level can also be formed where group membership is restricted to only students from the same class, or where students were assessed at the lowest skill level for different reasons. In a simple example, students may be deemed either deficient or not deficient in a skill or topic of knowledge, and the students may be grouped according to the deficiencies.

In some implementations, the groups may be formed using different criteria or combinations of criteria. For example, two groups may be formed as discussed above, and the group assignment for one or more individuals may be changed based on a social welfare function that accounts for homogeneity of student skills within the groups and group size, among other factors. The social welfare function may be used to evaluate, for each student and/or for all of the individuals of a group as a whole, the benefit to the individual(s) of membership in the group, given the current group membership. Thus, one or more students can be re-grouped in order to maximize one or more of these evaluations.

Similarly, other considerations may be used in making group assignment decisions. For example, a teacher may separate two students who would otherwise be grouped together based on a history of distraction or antagonism between the two students. Students may also be grouped based, at least in part, on criteria unrelated to skill level. For example, students may be grouped based on funding restrictions, such as where a particular source of funding requires that funds be spent only for students in particular category, such as English language learning students.

Once the candidates are grouped, a curriculum for each group can be created (130). Different curricula can be created for different groups based on, and designed to address, the different skill or knowledge levels demonstrated by the members of the different groups. Even among groups of students who demonstrated the same skill or knowledge level, different curricula can be created for the different groups based on different causes for the demonstrated skill or knowledge level indicated by the assessments. For example, a first group of students can be formed where the assessment for each of the students of the first group indicated the lowest level of reading comprehension skill due to a deficiency in a first component or precursor skill, such as vocabulary. The second group of students can be formed where the assessments for each student of the second group indicated the lowest level of reading comprehension skill due to a deficiency in a second component skill or precursor skill, or due to a deficiency in foundational knowledge, such as letter sound knowledge. Thus, a customized curriculum designed to teach vocabulary can be created for the first group, and a customized curriculum designed to teach letter sound knowledge can be created for the second group.

Each customized curriculum can be created based on, and designed to address, a knowledge or skill deficiency or expertise of the members of each group, and can then be delivered to the group members (140) of the associated group. For example, the first group may be limited to students only from the same class, or to students who have the same teacher for particular subject or category of subjects. The teacher can deliver the customized curriculum to the group members during the school day while non-group members participate in another activity, or after the school day during an after-school period. In some implementations, a specialized interventionist delivers the customized curriculum.

Once the delivery of the customized curriculum is complete, or partially complete, the students of the group can be reassessed (110) to determine whether the skill or knowledge levels of some or all of the group members has increased from the levels indicated by the first assessments. As discussed in greater detail below, the students can be regrouped based on the reassessment, or the groups can be maintained for a pre-determined number of cycles of assessing (110), grouping (120), creating of curriculum (130), and delivering of curriculum (140).

Figure 2:
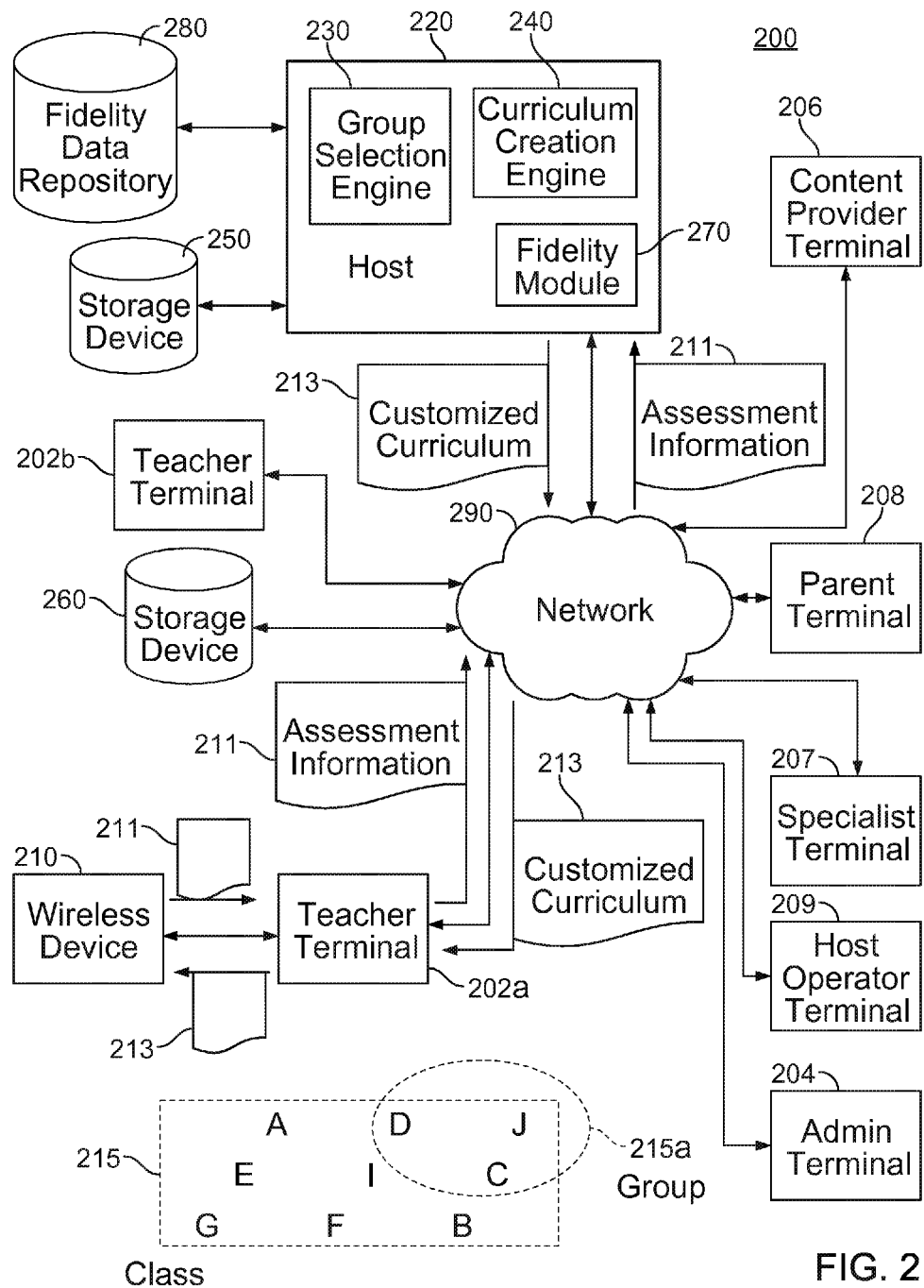
FIG. 2 is a diagram of an example of a system for creating an education intervention curriculum.

One or more of the steps of the process 100 discussed above, and/or additional steps, can be performed using a computer system. For example, in some implementations, a computer system, such as the system 200 of FIG. 2, can be used to assess candidates, group candidates based on the assessments of the candidates, create a curriculum for a group of candidates based on the assessments of the individuals of the group of candidates, and provide the curriculum and associated materials for delivery to the individuals of the group of candidates. With reference to FIG. 2, the system 200 includes teacher terminals 202a and 202b and an administrator terminal 204 that are operable to allow teachers and administrators to access and interact with a host 220. As illustrated, the teacher terminals 202a and 202b and the administrator terminal 204 are in communication with the host 220 through a network 290, such as the Internet, a local network, a wireless network, another type of network, or combinations thereof.

The teacher terminals 202a and 202b can be used by teachers to transfer information to, and to receive information from, the host 220. For example, a first teacher can transmit student assessment information 211 to the host 220, and the host 220 can receive the student assessment information 211 and store the student assessment information on a storage device 250, such as in the form of a database or other data structure. The assessment information 211 can include temporal information indicating a date and time at which the assessment information 211 was created.

The host 220 can access the assessment information and can determine the age of the assessment information based on the temporal information. A group selection engine 230 of the host 220 can select two or more students from among a class 215 of students A-J for inclusion in a group 215a based on the most recent assessment information 211.

Figure 5:
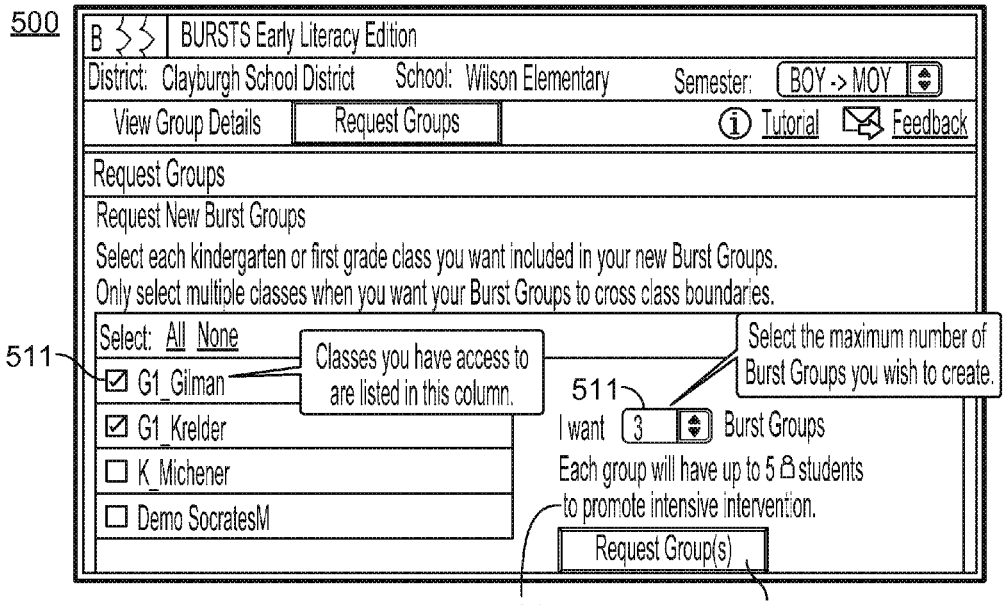
FIGS. 5 and 6 are diagrams of an example of a graphical user interface for creating an education intervention group.

For example, referring to FIG. 5, the host can present a graphical user interface 500 to a teacher or administrator after the teacher or administrator accesses the host 220 through the teacher terminal 202a or the administrator terminal 204 and the host authenticates the identity or other credential of the teacher or the administrator. The graphical user interface 500 permits the teacher or the administrator to request the host 220 to select students for inclusion in a group. The teacher or administrator can use the interface 500 to indicate criteria (or no criteria) for forming a group, and to submit a request for group member selection to the host 220.

For example, a teacher can indicate that a group is to be selected from among students in a class associated with a check box 511 by manipulating the check box 511 of the graphical user interface 500. Additionally, the teacher can indicate a number of groups to be selected from among the students in the indicated class(es) by manipulation of a menu 521 of the graphical user interface 500. A maximum number of students permitted in a group can be indicated by the teacher by manipulation of an input field 531 of the graphical user interface 500. When the teacher has finished indicating the various desired criteria of group selection, the teacher can submit a request for group formation that includes information pertaining to the selected criteria by manipulating a button 541 of the graphical user interface 500. The teacher terminal 202a can then transmit the request information to the host 220. When the host 220 receives the request information, the group selection engine 230 may select, for example, students C, D, and J for inclusion in the group 215a based on the request information and deficiencies in a common component skill, such as phonemic awareness, a deficiency in knowledge of a topic, such as letter sound knowledge, or a combination thereof demonstrated by students C, D, and J. Since, students C, D, and J are selected for inclusion in a specific group based on having common deficiencies, students C, D, and J may benefit from similar intervention activities.

Additionally, component skills and topics of knowledge may be organized hierarchically according to a predetermined order of the component skills or topics of knowledge from most fundamental to most advanced. Information pertaining to the hierarchy of the component skills and topics of knowledge can also be stored on the storage device 250 such that it is accessible by the host 220. Thus, the selection of students for inclusion in an intervention group by the group selection engine 230 can be based in part on the hierarchy of the component skills and topics of knowledge, and according to a most fundamental common deficiency. For example, in some implementations, if a first student's skill level in a particular skill is deficient, that student can be grouped with other students who have a deficiency in the particular skill, but not with students that have a deficiency in the particular skill as well as deficiencies in other, more fundamental skills or knowledge.

Figure 7:
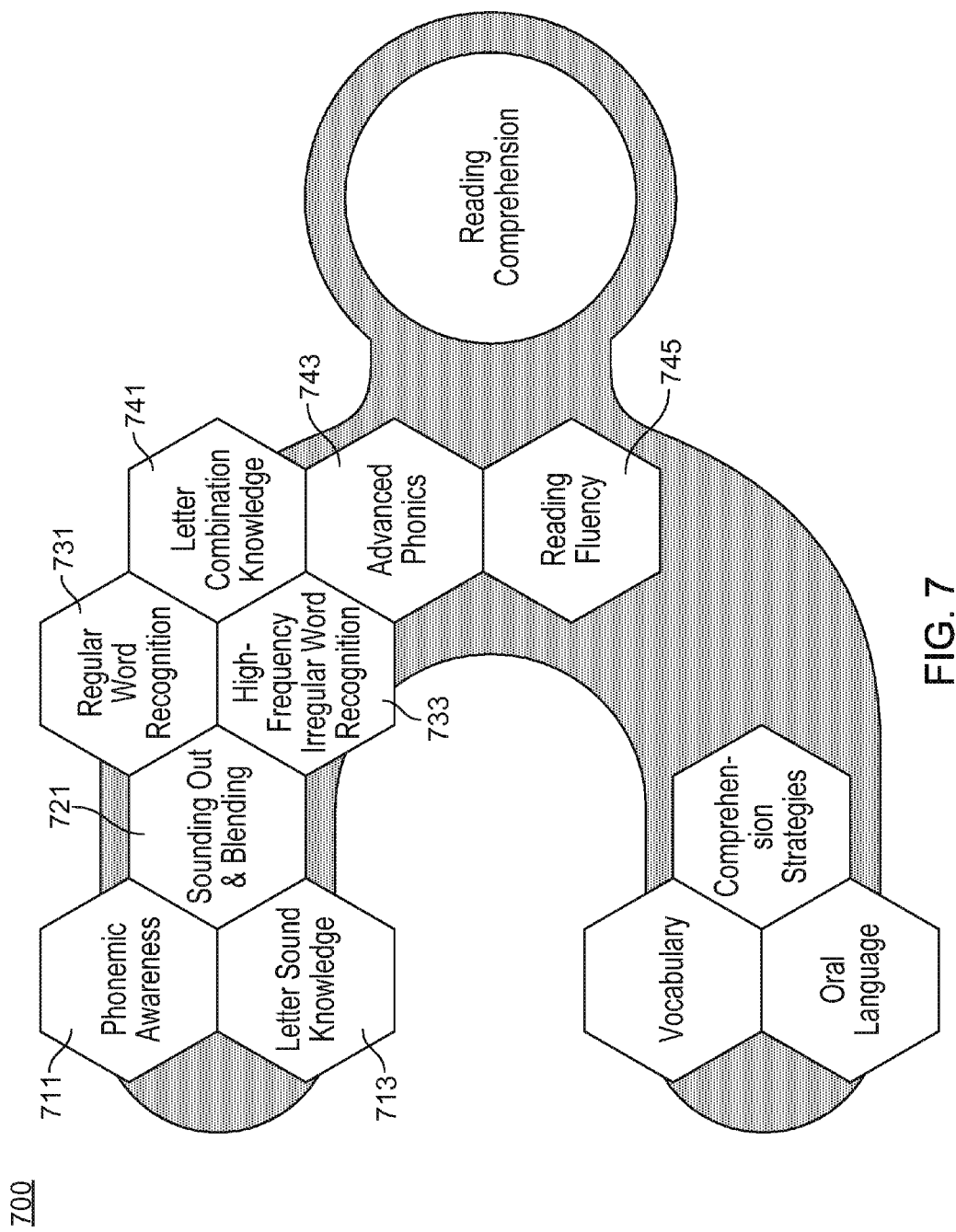
FIG. 7 is a diagram of an example of an organization of component skills of a subject.

Referring to FIG. 7, an example of a hierarchy of skills is illustrated. A data structure of the storage device 250 can include information regarding a relative place of each component skill and topic of knowledge within the hierarchy 700. Specifically, the storage device 250 can store data relating phonemic awareness 711 and letter sound knowledge 713 with a first, most fundamental level of the hierarchy 700, data relating sounding out and blending 721 to a second level of the hierarchy 700, data relating regular word recognition 731 and high frequency irregular word recognition 733 to a third level of the hierarchy 700, and data relating letter combination knowledge, advanced phonetics, and reading fluency to a fourth most advanced level of the hierarchy. In some implementations, the hierarchy corresponds to a dependency relationship, where acquisition of the skills and topics of knowledge of higher levels depend on demonstrated proficiency in the skills and topics of knowledge of lower levels.

Figure 6:
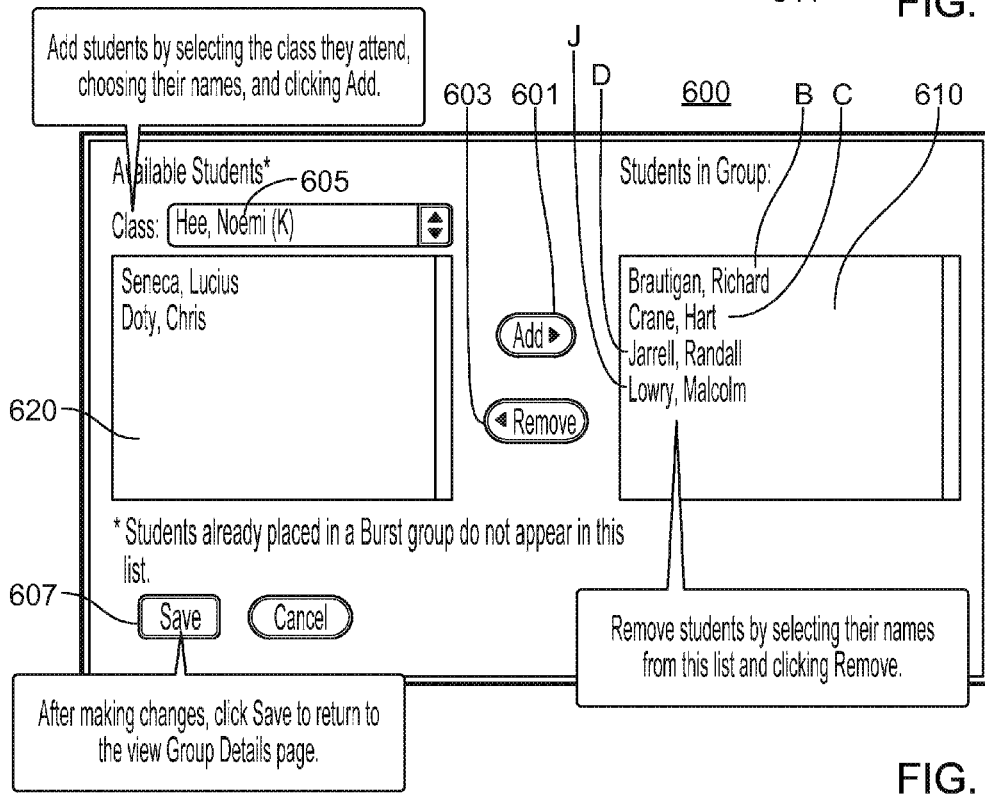

The groups can be formed solely based on the selections of the selection engine 230, as described above, and an indication of the students selected for inclusion in a particular group can be transmitted to the teacher terminal 202a. Alternatively, however, the selections of the group selection engine 230 may be ignored, replaced, or edited, by a selection of a teacher, an administrator, a specialist, or the host operator. For example, referring to FIG. 6, a teacher can access a graphical user interface 600 for adjustment of a group suggested by the host 220 based on the selections of the selection engine 230. In some implementations, a teacher can access the graphical user interface 600 through the teacher terminal 202a to review a list of students, such as students B, C, D, and J, suggested for inclusion in a group, such as intervention group 215a, that is displayed in a first group area 610 of the graphical user interface 600. The teacher can add students selected from a list of available students displayed in a second area 620 of the graphical user interface to the group list by manipulation of an add button 601. The teacher can remove students from the group list by manipulation of a remove button 603, whereby the removed students may appear in the list of available students. For example, student B can be removed from the group list. The list of available students may be filtered according to a selected filter, which filter can be selected or removed by manipulation of a menu 605. Submission of the selections made using the graphical user interface can be sent to the host 220 by manipulation of a save button 607. When the host 220 receives information regarding the submitted selections, the host can update selections of the selection engine 230 in the storage device 250 to generate group member information for each group formed.

Figure 8:
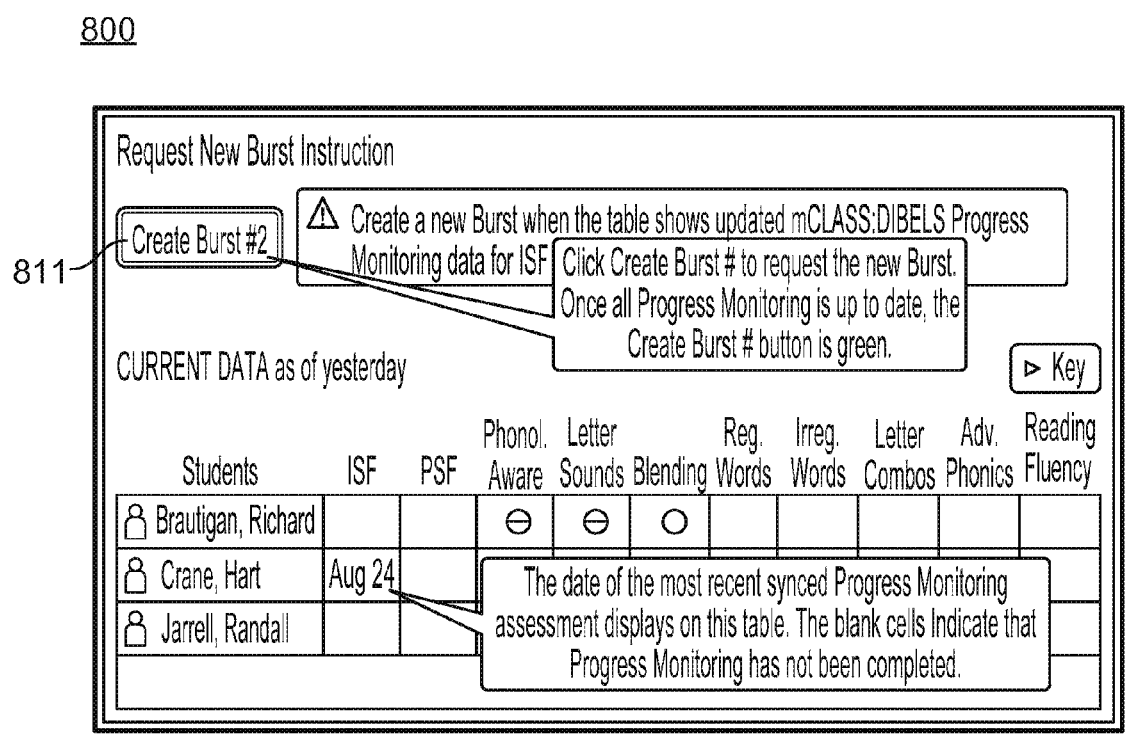

When the group 215a is formed by selection of students C, D, and J as the group members and corresponding group member information is stored in the storage device 250, the host 220 can create a customized curriculum 213 to address the specific common needs of the students C, D, and J of the group 215a. For example, a curriculum creation engine 240 can select activities from an activity library, such as a database or other data structure on a storage device 260 connected to the network 290 in response to receiving a request for a customized curriculum. Referring to FIG. 8, a graphical user interface 800 can be presented to a teacher or an administrator through the teacher terminal 202a or the administrator terminal 204, and the request for a customized curriculum can be generated by the teacher or administrator by manipulation of a curriculum request button 811. Additionally, the graphical user interface 800 can also include information regarding the group, including current skill and/or knowledge level information for each student in the group, and information regarding the basis for the current skill level information, including information regarding which assessments have been completed for each student, and date information regarding the most recent assessment information received for each student. The interface 800 can also include past skill and/or knowledge level information for comparison or progress monitoring.

The activities can be created and stored on the storage device 260 by the content provider using content provider terminal 206, which can be provided on an open-source or proprietary basis. The activities can include information about one or more component skill(s) and/or topic of knowledge. Optionally, the activities can include a difficulty level of the activity for each component skill or topic of knowledge. In some implementations, the activities of a library of activities can be associated with a particular component skill or topic of knowledge, where the association allows the curriculum creation engine 240 to identify the activity as appropriate for an intervention group including students with deficiencies in the particular component skill or topic of knowledge. Additionally, each activity can include an indication of a difficulty level of the activity on a continuum of difficulties of activities associated with the particular component skill or topic of knowledge. Thus, the difficulty level can be thought of, or expressed as, levels of progression that reflect skill or knowledge development or acquisition. The continuum can additionally include groups of difficulty levels, such as introduction level activities, reintroduction level activities, accuracy-building level activities, fluency-building level activities, and mastery-building level activities. Also, the activities can include adjustment information that relates to changes that can be made to the activity to adjust the difficulty level of the activity up or down the continuum, and/or to include other skills and/or topics of knowledge. Thus, as discussed with reference to FIG. 7, the skills and topics of knowledge can be arranged in a progression from basic to complex, and the activities associated with those skills and/or topics of knowledge can be arranged from introductory to mastery such that the activities can guide the students from introduction to mastery of each of the component skills and topics of knowledge, as necessary based on the assessment information of the students.

The curriculum creation engine 240 can arrange activities included in a customized curriculum 213 in an order of presentation based on the difficulty levels associated with the activities. Thus, the customized curriculum 213 can include an ordered sequence of activities for delivery to the intervention group members based on a match between a deficient or advanced skill or topic of knowledge of the intervention group members and based on the relative difficulty level of the activity. For example, information regarding a pre-selected sequence of activities designed to teach a particular skill or topic of knowledge, and the curriculum creation engine 240 can retrieve and organize the activities in the pre-selected sequence based on a match between the particular skill or topic of knowledge and a deficient skill or topic of knowledge of the intervention group members. The actual skill levels of the group members may be used to identify a proper starting point within the pre-selected sequence of activities. Additionally, different pre-selected sequences can be created for different skills, combinations of skills, and/or for different paces of learning.

In some implementations, the curriculum engine 240 can select activities for inclusion in the customized curriculum from among all available activities. Additionally, the curriculum creation engine 240 can select activities from among a broader or narrower range of difficulty levels to control the pace of the curriculum. For example, each curriculum can include activities for 10 lessons of approximately 30 minutes in duration, and the activities can be selected only from introduction and reintroduction activities to create a slow-pace curriculum. In other instances, the curriculum can include activities from all levels, or from a selected subset of levels. Since each curriculum includes 10 lessons, a curriculum including lessons selected from fewer difficulty levels will include more activities from the same difficulty level. The curriculum creation engine 240 can select the subset of activity difficulty levels based on an indication of desired pace provided by the teacher or administrator, automatically based on past rates of skill or knowledge acquisition demonstrated by previous assessments, or based on a combination thereof. Once completed, the host 220 can then transmit the customized curriculum 213 to the teacher terminal 202a for review and/or modification by the teacher, and for subsequent presentation of the activities to the students C, D, and J of the intervention group 215a according to the customized curriculum 213.

The system 200 can additionally include a wireless device 210 for use in facilitating the assessment/reassessment (110) of the students A-J. In some implementations, the wireless device 210 can be formed as a portable, handheld computer having a skill assessment software program stored thereon, such as an assessment platform device and software available from Wireless Generation, Inc. under the trademark MCLASS®. The wireless device can be configured to receive inputs from a teacher in real time during an observational or other assessment of a student's skill level, and to store the inputs, or a derivative of the inputs, as the assessment information. For example, the teacher may indicate errors or correct responses provided by the student on the wireless device as the student gives responses to assessment questions or tasks.

Additionally, the wireless device 210 can receive some or all of the customized curriculum 213, such as at least one activity, for use in facilitating presentation of the curriculum activities to the students C, D, and J of the intervention group 215a. Where the wireless device is configured to receive the activities of the customized curriculum 213, the wireless device may additionally receive the adjustment information, whereby the difficulty level of an activity can be adjusted up or down according to the adjustment information before or during presentation of the activity to the students C, D, and J. Furthermore, or as an alternative, the wireless device 210 can be configured to receive an indication from the teacher that a delivered lesson was too difficult or too easy. The indication can be communicated to the teacher terminal 202a and/or the host 220 for adjustment of other activities in the curriculum, or for use in adjusting the individuals included in the group.

With continued reference to FIG. 2, a specialist terminal 207, a parent terminal 208, and a host operator terminal 209 are in communication with the host 220, the storage device 260, and/or one or more other terminals of the system 200. The specialist terminal 207, the parent terminal 208, and the host operator terminal 209 may be configured to enable a specialist teacher or administrator, a parent, and/or a host operator to access the host 220, the storage device 250, the storage device 260, or other component of the system 200. For example, a specialist teacher or administrator, or a parent may be able to review some or all assessment information stored on the storage device 250. Additionally, the specialist teacher or administrator, or the parent, may be able to access the customized curriculum, or supplemental activities, for use in presenting activities to a student.

Figure 9:
FIG. 9 is a diagram of an example of a graphical user interface displaying information regarding an intervention group.

Referring to FIG. 9, a display 900 may be used to permit a teacher or an administrator to access assessment information that is associated with the teacher's or the administrator's user account. The display 900 includes assessment information for each group member of an intervention group, including indications 910 indicating that current assessment information for a student indicates a high skill level in an associated skill, such that the student can be deemed to have successfully acquired the skill. An indication 920 indicates that an associated student's current assessment information indicates that the student has a skill level in an associated skill less than a level indicated by the indication 910, but greater than a skill level denoting an unacceptably low skill level, or a skill level less than a predetermined threshold, which is indicated by an indication 930. The display 900 can further include an indication 940 for indicating the component skills or knowledge topics that are addressed by the customized curriculum for the group. An indication 950 indicates that a student should be removed from the group for some reason, such as successful acquisition of all the component skills or topics of knowledge that are addressed by the curriculum of the intervention group. The display 900 can include a navigational link 955 operable to provide a graphical user interface to the teacher by which the composition of the group 215a can be modified, such as the graphical user interface 600 of FIG. 6. Similarly, an indication 960 indicates that a student is an outlier, such as due to a deficiency in a component skill or knowledge that is more fundamental than the skills that are addressed by the customized curriculum for the group, or due to a deficiency in acquiring the skills that are addressed by the customized curriculum for the group. An indication 970 can be included that indicates which component skill is deficient, and that remediation of the deficiency should be, or will be, addressed with supplemental activities in a next customized curriculum.

The display 900 of FIG. 9 additionally illustrates a feature discussed above with regard to the selection of activities for inclusion in a curriculum. The indication 960 indicating that an associated student is an outlier is not necessarily an indication that the outlier student should be removed from the group, even though the activities of the curriculum were selected to address component skills or knowledge that is more advanced than the most fundamental skill or knowledge topic for which the associated student exhibits a deficiency. Specifically, the indication 940 indicates that letter sounds knowledge and blending skills are the focus of the curriculum. These intermediate component skills and knowledge can be selected despite the deficiency of one student in phonemic awareness, which is a more fundamental component skill, because the curriculum selection engine 240 can be configured to select activities based on the most fundamental skill in which the assessment information for two or more students indicates a deficiency. Thus, since three students have a deficiency in letter sound knowledge and blending, the curriculum can include activities that address letter sound knowledge deficiency and blending skill deficiency. Additionally, the display 900 illustrates that a limit on the number of skills and knowledge topics to be addressed by the curriculum can be provided. For example, a limit of two can be set for the number of skill to be addressed by a curriculum, and, accordingly, the curriculum does not include activities to address a deficiency in the regular word recognition skill, despite the fact that each of the students in the intervention group 215a is deficient in this skill. Deficiencies in more advanced component skills and knowledge can be addressed by subsequent curricula.

Such a progression of the skills and knowledge addressed by a series of curricula can also provide an explanation for the situation discussed above, where one or more students exhibit a deficiency in a skill that is more fundamental than the skills and knowledge addressed by the current curriculum. Specifically, the student exhibiting the deficiency in the more fundamental skill may not have acquired the more fundamental skill as quickly as the other students when that skill was addressed by one or more previous curricula. Thus, providing additional instruction for the outlier student may allow the outlier student to acquire the more fundamental skill without the disruption and/or delay associated with moving the outlier student to a different group, such as a group for which a current curriculum addresses the more fundamental skill.

Referring again to FIG. 9, the display 900 includes a navigational link 980 that is operable to access a customized curriculum generated for the intervention group based on the assessment information. If a customized curriculum has not been generated for the intervention group based on a particular set of assessment information, then the display 900 includes a navigational link 985 operable to request a customized curriculum based on the particular set of assessment information. When the customized curriculum has been created for the particular set of assessment information, the display 900 can include a navigational link that is operable to access the customized curriculum for the particular set of assessment information, like navigational link 980.

Activating the navigational link 980 allows the teacher or administrator to access the customized curriculum. For example, activating the link 980 can automatically transmit the customized curriculum to a selected email address, such that the curriculum is delivered in an electronic file that can be saved, viewed, and/or printed. In some implementations, activating the navigational link 980 allows the teacher or administrator to access the customized curriculum over the network 290 only, or activating the navigational link 980 can cause the customized curriculum to print locally only. If accessed over the network 290, the customized curriculum can be presented on a monitor of the teacher terminal 202a, or on the wireless device 210. Examples of the printed customized curriculum materials, or the materials displayed on the teacher terminal 202a or the wireless device 210 are illustrated in FIGS. 10 and 11.

Regardless of the mechanism for accessing the customized curriculum, the customized curriculum includes a plurality of activities, which are grouped into a plurality of lessons. In some implementations, each customized curriculum includes fifty activities grouped into ten lessons, with five activities each. The lessons are designed to be provided to the members of the intervention group sequentially, with one lesson being provided per day. In addition to the individual activities, each customized curriculum includes an overview that summarizes the contents of the entire customized curriculum. For example, as illustrated in FIG. 10, the overview 1000 includes lists 1001-1010 of activities arranged in order of intended completion during the lessons of the curriculum. The overview 1000 also includes an indication 1011 of the curriculum period, such as the sequential number of the customized curriculum in a series of customized curricula generated for the intervention group. An indication 1012 of the intervention group members and an indication 1013 of the component skills or knowledge topics that are addressed by the customized curriculum for the group are also included in the overview 1000.

Figure 11:
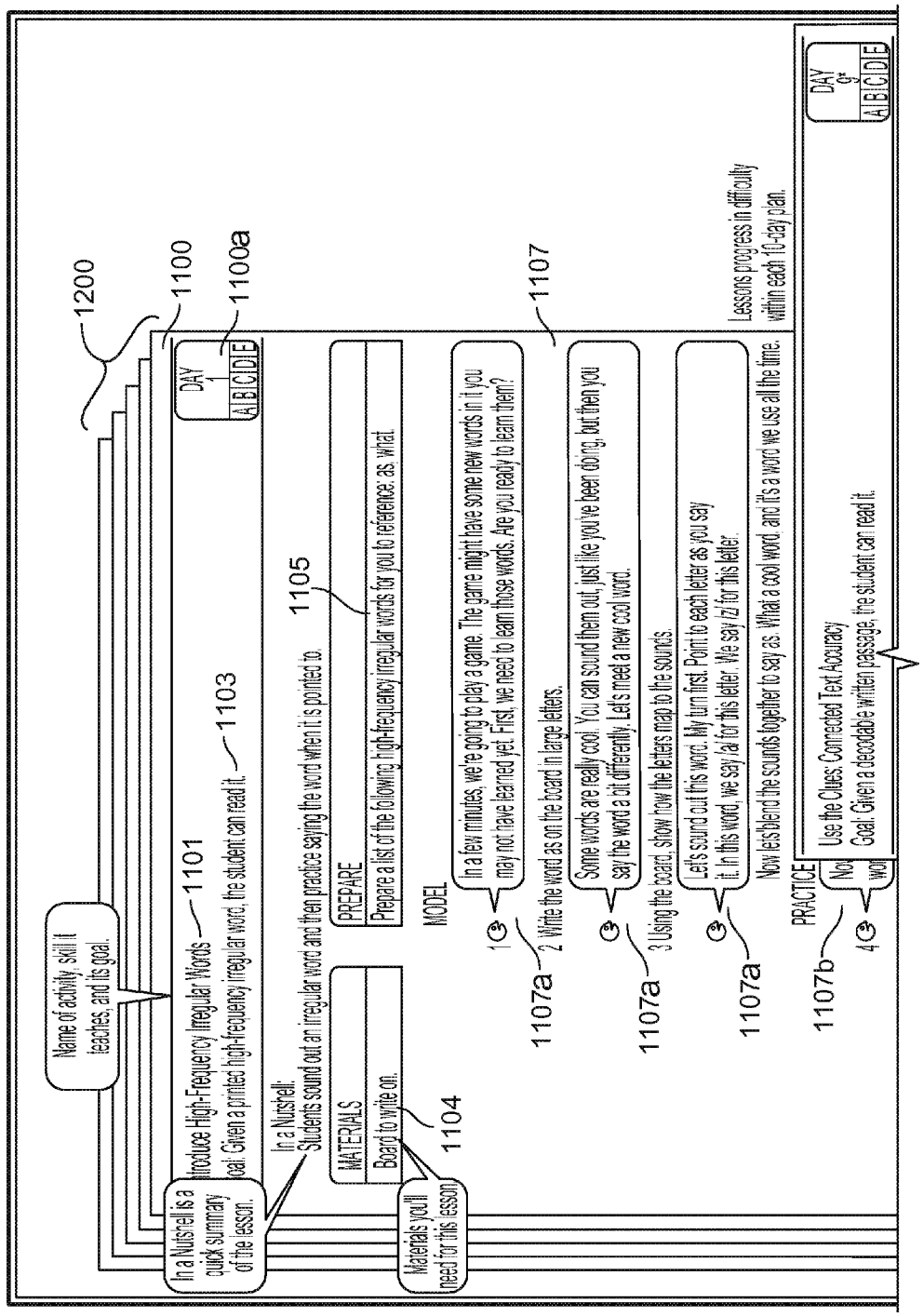
FIG. 11 is an illustration of an example of instructions for an activity of a lesson of a customized curriculum.
Figure 11:
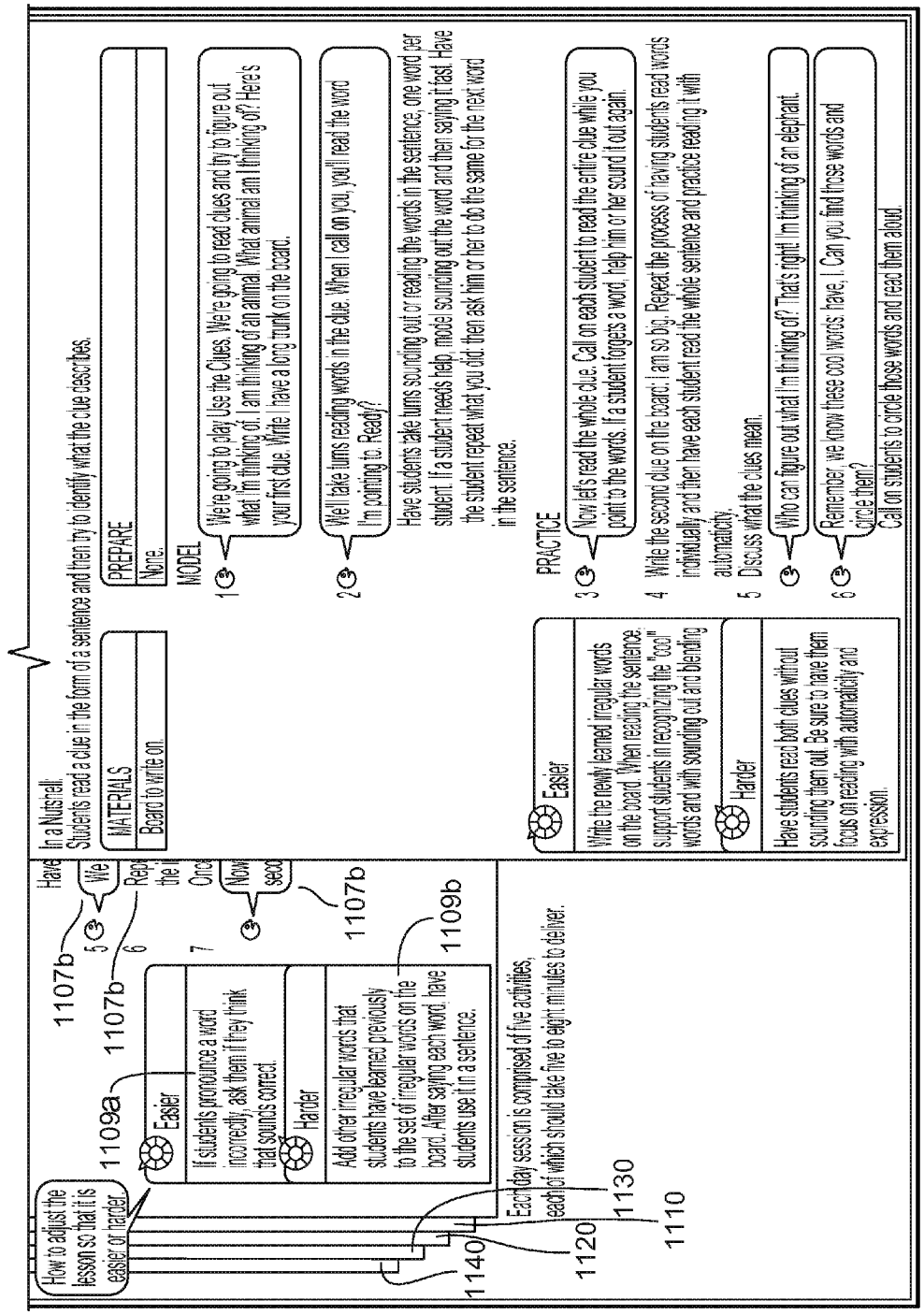

With reference to FIG. 11, an activity instruction set 1100 is included for each activity of each lesson of the customized curriculum. The activity instruction set 1100 includes information for use by the teacher in providing an associated lesson to the intervention group members. For example, the activity instruction set 1100 includes an activity title 1101 that identifies the name of the activity and a statement of the goal of the activity. The activity title 1101 can be included in the lists 1001-1010 of the overview 1000 for convenience and ease of navigation within and/or use of the customized curriculum. Additionally, the activity title 1101 can be descriptive in nature so that the goal and/or the methodology of the activity are apparent from the overview 1000. The activity instruction set also includes a descriptive summary and/or explanation 1103 of the activity. In order to assist the teacher in adequately preparing to provide the lesson to the intervention group members, the activity instruction set 1100 includes a materials list 1104 and preparation instructions 1105. For example, flashcards, markers, paper, or other materials may be necessary or beneficial based on the specific tasks associated with the activity, and these materials can be included in the materials list 1104 such that the teacher is prepared to provide all of the listed materials when providing the lesson to the intervention group. Other necessary preparation, such as selection of vocabulary words, may also be necessary or beneficial, and preparation tasks or other instructions 1105 are also provided.

The activity instruction set 1100 also includes a guide 1107 for providing the activity to the intervention group. Among other kinds of guidance instructions, the guide 1107 can include modeling guidance 1107a for the teacher to perform, including a script or suggested dialogue or explanation, and practice guidance 1107b for the teacher to perform to elicit participation from the intervention group members. In practice, the guide 1107 can be followed more or less faithfully at the discretion of the teacher, especially where the teacher identifies that the effectiveness of the activity is below an expected or desired level. For example, where the activity is too difficult or too easy, the effectiveness of the activity for the intervention group may suffer. The activity instruction set 1100 can include adjustment information 1109a and 1109b that can be used to adjust the difficulty of the activity to make the activity harder or easier.

Thus the customized curriculum includes the overview 1000 and a plurality of activity instruction sets, such as activity instruction sets 1100-1140, which make up a single lesson 1200 of the curriculum. For orientation, the instruction sets can each include a legend 1100a that indicates the place of the associated activity in the lesson, and the place of the lesson in the customized curriculum.

Figure 3:
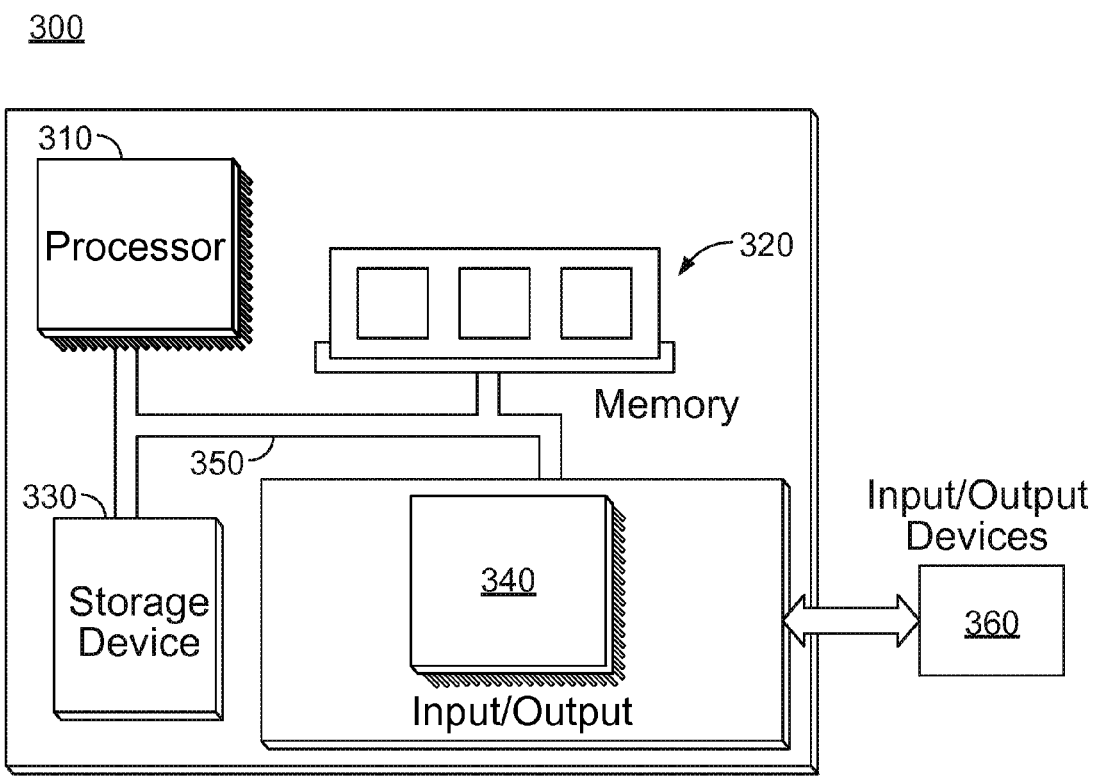
FIG. 3 is a diagram of an example of a general purpose computer system.

One or more of the terminals 202a, 202b, 204, 206, 207, 208, and 209, the host 220, the storage devices 250 and 260, and/or the wireless device 210 can be formed as general purpose computers, such as the general purpose computer 300 illustrated in the diagram of FIG. 3, including a processor 310, a memory module 320, a storage device 330, an input/output device 340, and a system bus 350. The processor is operable to execute instructions in the form of a computer program or application stored in the memory module 320 or stored on the storage device 330. Additionally, information can be stored in a data structure in the memory module 320 or on the storage device 330. The input/output device 340 is operable to transmit signals or data from the processor 310, the memory module 320, and/or the storage device 330 to an input/output device 360, and to receive signals or data from an input/output device 360. An input/output device can be a computer network communication device operable to communicate over the Internet, such as a modem. Thus, a computer-implemented process can be carried out using the computer system 200 by execution of computer-executable instructions in the form of one or more computer software program.

Figure 4:
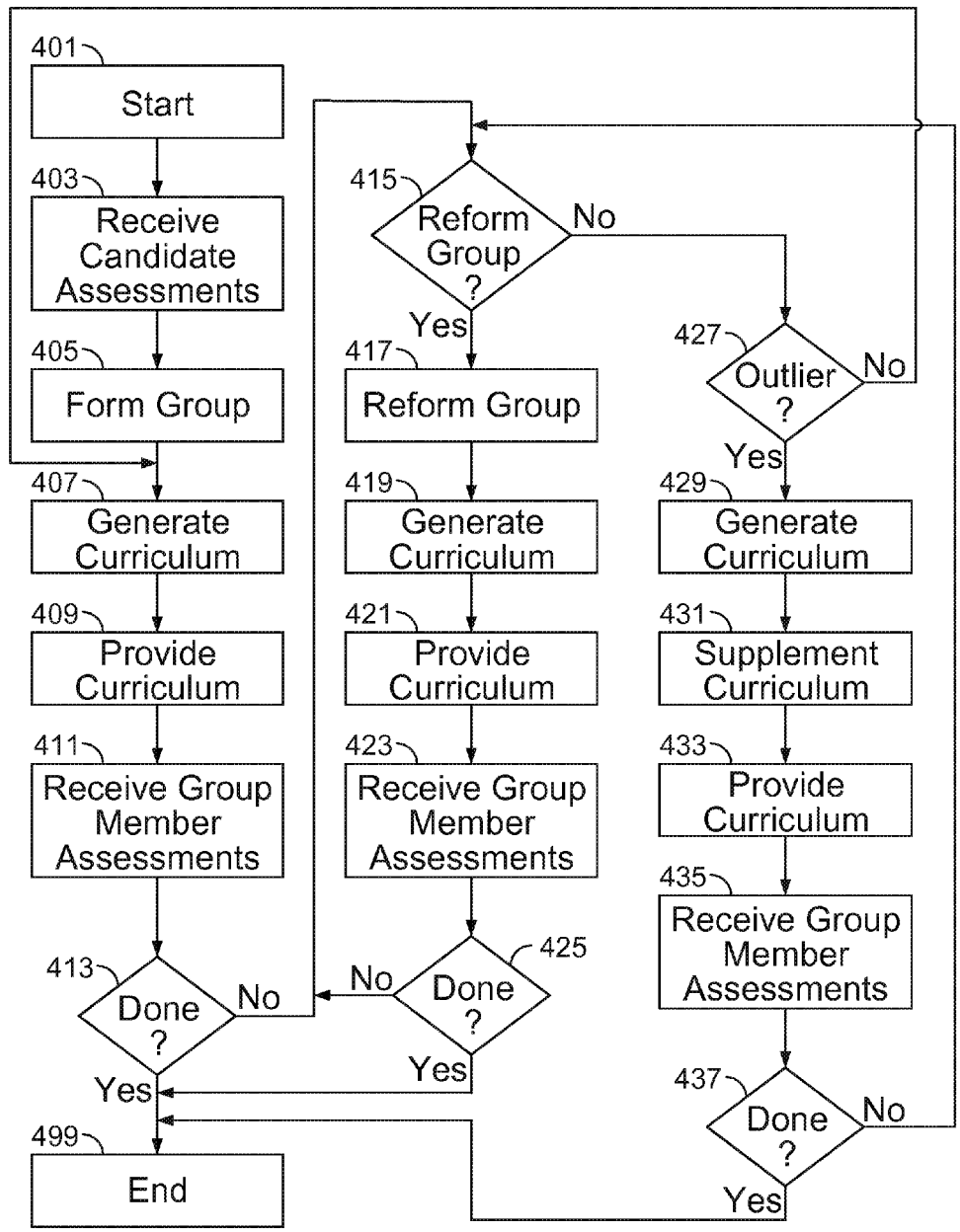
FIG. 4 is a flow chart of an example of a process for education intervention.

With reference to FIG. 4, a computer system such as the computer system 200 can be configured to perform a computer-implemented process 400. The process 400 begins (401) upon receipt of a request or instruction. Candidate assessment information, such as DIBELS® assessment data, can be generated by and sent from an MCLASS® device 210, a teacher terminal 202a, or an administrator terminal 204. For example, the DIBELS® assessment information can be generated by receiving and storing inputs from a user, such as a teacher, regarding errors in a candidate's responses to assessment questions. Other types of assessment data can additionally or alternatively be generated, such as MCLASS® reading 3D assessment data. Mandatory assessment data required under governmental authority can also be included, or used exclusively. The host 220 receives the candidate assessment information for candidates (403) and stores the candidate assessment information in a database or other data structure on the storage device 250.

Based on the stored candidate assessment information, the host 220 can recommend intervention groups for selected candidates, if necessary. For example, the group selection engine 230 can analyze the assessment information to determine, for each candidate, the two skills or topics of knowledge for which the candidate's assessment information indicates a deficient skill level compared to the candidate's skill level in the other skills or topics that were included in the assessment or relative to a particular standard with respect to the skill. Specifically, the group selection engine can identify the two most fundamental skills or topics of knowledge for which the assessment information indicates a deficiency from a hierarchy of skills and topics of knowledge that is organized according to a learning progression, where more fundamental skills or topics of knowledge are generally precursors for subsequent acquisition of more advanced skills or topics of knowledge. The group selection engine 230 can then recommend that two or more candidates be grouped in an intervention group based on the two or more candidates having a deficient skill level in the same two skills or topics of knowledge and based on each of the two or more candidates having approximately the same or a similar level in the two skills or topics of knowledge. The group selection engine can also recommend intervention groups based on additional criteria, such as commonality of class teacher, a maximum number of group members per group, a maximum number of groups per class, a maximum number of groups per teacher, or a selection of skills for which a deficiency should not cause inclusion in an intervention group, among others.

The host 220 can then form an intervention group (405), such as group 215a, based on the selections. Alternatively, the host 220 can provide the selections to the teacher terminal 202a or the wireless device 210 for review by the teacher or an administrator. The host 220 can receive approval of the selections and/or alternative selections made by the teacher of the administrator, and form the group (405) based on the approval and/or alternative selections.

Once a group is formed, the host can generate a customized curriculum for the group (407). The customized curriculum can include a series of lessons to be delivered over a curriculum period, such as a two-week period. Each lesson can include multiple activities selected based on the assessment information for the individuals who are members of the intervention group. In some implementations, the curriculum can include ten lessons, with five activities included in each lesson. In other implementations, other numbers of activities and/or other numbers of types of activities. For example, where 5 activities are included, one of the activities can be a game. In another example, only two activities are included in each lesson.

The activities can be selected by the curriculum selection engine 240 from a library of activities stored on the storage device 260, which can include activities that are designed to provide an opportunity to apply skills or knowledge in a target environment, such as where the activities are designed to allow derivation of meaning from connected text. The activities are selected to remediate the deficiencies in the two skills or topics of knowledge that were identified during group formation (405). In some implementations, the curriculum can be generated (407) by selecting activities at or near a lowest difficulty level of activities appropriate for at least two individuals of the intervention group. Thus, the intervention group members who have higher levels of skill or knowledge can receive more difficult or advanced activities than they would receive if the activities were selected based on the lowest difficulty level appropriate for any single individual of the intervention group. The activities can be selected such that each lesson includes a plurality of types of activities, such as introductory activities that convey information or knowledge and practice activities that provide an opportunity for the intervention group members to participate. The practice activities may allow the group members to apply skills and knowledge in a target environment for reinforcement of the skills or knowledge, and/or for deriving knowledge or skills, such as where meaning is derived from connected text.

Additionally, the curriculum can include adjustment information, such as information regarding an adjustment to a specific activity to adjust a difficulty level of the activity up or down at the discretion of a teacher. Alternatively, the adjustment information can include additional activities that have a higher or lower difficulty level than activities scheduled for presentation by the teacher, such that the alternative activities can be used to replace the scheduled activities based on an input from the teacher indicating that an activity or lesson is too easy or too difficult, at least with respect to one component skill or topic of knowledge.

The host 220 can then provide the curriculum to the teacher (409), such as by transmitting a message to the teacher terminal 202a or the wireless device 210, or by making the curriculum available for access by the teacher. The teacher can then access the curriculum, and present the activities of the curriculum to the students C, D, and J of the intervention group 215a according to the ten day schedule of the curriculum.

When the curriculum period is substantially complete, such as on or after the seventh day of the ten day period, the teacher or an administrator can reassess the students C, D, and J of the intervention group 215*a*. Assessment information for the intervention group members resulting from the reassessment can be transmitted to the host 220. When the host 220 receives the assessment information for the intervention group members (411), the host can store the assessment information in the storage device 250 as current assessment information, such as based on time information included in the assessment information. The host 220 can then determine whether a period for the intervention is complete (413), and end (499) if the intervention is complete. For example, the host 220 can determine that the intervention period is complete when all the intervention group members have demonstrated acceptable or expected knowledge or skill levels.

If the intervention is not complete, the host can determine whether the intervention group is to be reformed (415). For example, the host 220 can determine that the group should be reformed in response to a request to reform the group received from the teacher or an administrator. Alternatively, the host 220 can automatically determine that the group needs to be reformed based on the current assessment information, such as when the levels of skill or knowledge of the two or more group members differs more than a predetermined amount. If the group is to be reformed, the host 220 may reform the group (417) by analyzing current assessment information for all candidates, as discussed above. Alternatively, where appropriate, the host 220 can reform the group (417) simply by removing a student from the group for whom current assessment data indicates that no skills being addressed by the intervention curriculum are deficient.

After reforming the group, the host generates a customized curriculum for the group (419) for a next curriculum period, provides the curriculum to the teacher or the administrator (421), and waits to receive current assessment data created after the curriculum period is substantially complete (423). The host 220 can then determine whether the intervention is complete (425), and if it is, the process can end (499). If the intervention is not complete, the host 220 can return to determine whether the group should be reformed (415). The host can generate a customized curriculum for the group (419) based on a history of prior customized curricula that have been generated for the group. For example, repetition of identical activities can be avoided based on a comparison of a selected activity type and activity content with stored information of activity type and activity content of a curriculum previously generated for the group. Similarly, repetition of a previously selected activity type, or repetition of previously selected activity content in a different activity type can be accomplished, if desired, based on a comparison of a selected activity type and selected activity content with previously-selected activity types, content, and combinations of activity type and content. To illustrate, in some implementations, such as implementations where vocabulary familiarity or vocabulary reinforcement is desired, the same vocabulary words may be reused in subsequent curricula in different activity types, such as activities adapted to teach a different skill, or to teach the same skill at a different difficulty.

If the host 220 determines that the group should not be reformed (415), the host can determine whether the current assessment information for the intervention group indicates that there is an outlier individual in the group (427). For example, the host 220 can determine that there is an outlier individual in the group when all or most of the members of the group continue to have a deficiency in the skills or knowledge topics, but the current assessment information for one individual indicates a level lower than the level of the other group members by an amount greater than a threshold amount. If the host 220 determines (427) that the assessment group includes an outlier individual, the host 220 can generate a customized curriculum (429), as described above, and can then supplement the customized curriculum (431) with an outlier supplement for presentation to the outlier individual. The outlier supplement can include activities selected from a lower difficulty level, commensurate with the lower level of skill or knowledge of the outlier. Although the outlier supplement is selected based on the level of skill or knowledge of the outlier individual, the outlier supplement may, optionally, be presented to the entire intervention group.

The host 220 can then provide the supplemented customized curriculum to the teacher or the administrator (433) for subsequent presentation to the members of the intervention group during the curriculum period, and can wait to receive current assessment data created after the curriculum period is substantially complete (435). The host 220 can then determine whether the intervention is complete (437), and, if so, the process can end (499). If the intervention is not complete, the host 220 can return to determine whether the group should be reformed (415).

If the host 220 determines that intervention group does not include an outlier individual (427), then the process can generate a customized curriculum (407), provide the curriculum to the teacher or administrator (409) for subsequent presentation to the intervention group members over the curriculum period, and wait to receive current assessment data (411) created after the curriculum period is substantially complete. The host 220 can then determine whether the intervention is complete (413), end (499) if the intervention is complete, and determine whether the group should be reformed (415) if the intervention is not complete.

Referring again to FIG. 2, the host 220 also includes a fidelity module 270 to determine a level of fidelity to an educational process, such as the teacher's portion of the processes described with respect to FIGS. 1 and 4. The fidelity level is determined by the fidelity module 270 based on one or more fidelity factor values that indicate a relative level of fidelity of the implementation of the process to a model implementation of the process. Based on the determined fidelity level, alert messages are generated and transmitted to the teacher, an administrator, a parent, or other user of the system 200. The alert messages provide feedback regarding adequate and inadequate aspects of the implementation in order to notify the users of the fidelity status and to improve or maintain the fidelity level. Additionally, the fidelity module 270 can generate reminder or prompting messages, such as weekly reminders to obtain performance assessment data for each of the students of the intervention group and/or create a new customized curriculum.

The fidelity factor values are determined by the fidelity module 270 based on historical usage data regarding usage of system 200, and/or user-provided historical implementation data regarding curriculum implementation events occurring outside the system 200, e.g., events that the system 200 does not monitor directly. The user-provided historical implementation data can include both objective data, such as student or teacher attendance information, as well as subjective data, such as a quality rating for a student's participation level. In order to obtain the historical usage data, the host 220 records selected information in a fidelity data repository 280. For example, the host 220 can record an indication in the fidelity data repository 280 of whether and when a customized curriculum 213 is requested and/or created. Additionally, indications can be stored regarding whether and when assessment information 211 is received for the students of the intervention group, and/or an amount of time during which the teacher provided each lesson of the customized curriculum. In some implementations, the indications can be stored in the fidelity data repository 280 automatically each time the relevant information 211 is received, and a time of receipt can be stored to indicate when the relevant information 211 was received by the host 220. The fidelity module 270 can also access the storage device 250 periodically, or upon receipt of a request for a determination of a fidelity level, and extract indications regarding the assessment information 211 for storage in the fidelity data repository 280. This information, including the assessment information, can be used to determine whether the teacher is following the educational processes by timely accessing the customized curricula, teaching the customized curricula for an adequate amount of time, timely obtaining and submitting updated assessment information, and to determine whether the educational processes are effective.

In some implementations, different information can also be stored for use in generating values of different fidelity factors. For example, the host 220 can store an indication of the time when the assessment information 211 was generated, i.e., the time when a student's knowledge or skill level was assessed. Other types of historical usage data that can be recorded by host 220 include assessment start time data that indicates when a student assessment was initiated, assessment end time data that indicates when the student assessment ended, assessment duration data, assessment completion data that indicates whether each item of an assessment was completed, lesson instruction start time data that indicates when an instruction session was initiated, lesson instruction end time data that indicates when the lesson instruction ended, lesson instruction duration data, lesson instruction completion data indicates whether each item or each activity of the lesson was completed, participation data that indicates which students participated in which activities, curriculum creation time data that indicates when a curriculum was requested by a user, curriculum access time data that indicates when a teacher accessed the generated curriculum, curriculum access duration data that indicates an amount of time the teacher reviewed the curriculum, curriculum material printing time data that indicates when materials included in the curriculum were stored and/or printed, and data regarding usage of a daily teacher log or journal, such as a notepad for tracking group progress or group member behavior. Other types of historical usage data can also be stored, if desired, in order to provide sufficient information upon which to base a determination of each fidelity factor. In some implementations, the students can interact with electronic materials, such as practice tasks or quizzes, and information regarding their activity, including their responses, can be stored automatically.

The host 220 can store raw data, such as the data listed above, and/or processed data in the fidelity data repository 280. Processed data can include, for example, assessment frequency data that represents an average number of days between days for which assessment data has been stored. In some implementations, the fidelity module 270 analyzes the raw data automatically to obtain the processed data. As another example, a fidelity factor that can be used includes a value that is generated based on a trend of the overall fidelity level, or of other fidelity factors. For example, where a fidelity level for a teacher's implementation of the processes improves over a period of time due to student assessment information that indicates skill acquisition, or where the teacher's implementation of the processes more closely matches the model implementation, a value for this fidelity factor can increase as an indication of improvement.

The fidelity module 270 generates values for the fidelity factors by analyzing the historical usage data and the user-provided historical implementation data. In some implementations, the fidelity module compares raw or processed data to predetermined threshold values and generates the values based on the comparison. For example, for a lesson completeness fidelity factor, the fidelity module 270 can determine a number of days for which all items of each activity were completed during delivery of the day's lesson. The determined number (e.g., out of a maximum of ten lessons per curriculum) can be used as the completeness fidelity factor value, and provides an indication of the faithfulness of the implementation of the curriculum to the intended implementation, e.g., where all lessons are delivered in their entirety. Alternatively, other scales, such as a grade scale from A through F, can be used, as can other processes for generating the completeness fidelity factor value. Other fidelity factors include an activity modeling fidelity factor that provides an indication of whether the instructor provides each model item of each activity, an activity practice fidelity factor that provides an indication of whether the instructor provides each practice item of each activity, an activity adjustment fidelity factor that provides an indication of whether the teacher adjusts the difficulty of the practice items of the activities, a student participation fidelity factor that provides an indication of whether each student of the group participates in each activity, a goal accomplishment fidelity factor that provides an indication of whether the teacher allows each student to accomplish the lesson goals before progressing, a timing fidelity factor that provides an indication of whether the teacher completes lessons within a predetermined range of time, an encouragement fidelity factor that provides an indication of whether the teacher encourages participation from each group member, and a customization fidelity factor that provides an indication of whether the teacher addresses individual needs of the group members within the curriculum framework.

For example, the teacher may use the wireless device 210 during presentation of the lesson activities, and the wireless device 210 can store data indicative of access of each of the items of each activity. Additionally, for the practice items, the teacher can indicate on the wireless device 210, during the lesson, which students participate in which activities. The wireless device 210 can also be used to receive the subjective user-provided data, such as an indication of the level of engagement of each student. For example, when accessing a practice item of a lesson activity using the wireless device 210, the teacher can select all the students who participate in the practice item, and grade the student's engagement level on a scale of 1-5. The wireless device 210 can then transmit the stored historical usage data and the user-provided historical implementation data to the host via the teacher terminal 202*a*.

While these fidelity factors relate to the delivery of the curriculum lessons to the students of the intervention group, other fidelity factors can be used that relate to teacher preparation and/or general system usage. For example, a teacher preparation fidelity factor value can be generated to indicate whether a teacher is adequately preparing for each lesson based on the curriculum review time, whether using the teacher terminal 202*a* or the wireless device 210. For example, historical usage data indicating review time of thirty minutes or more for a lesson may lead to a binary value of "1" being set for the preparation factor for the lesson by the fidelity module 270. If less than thirty minutes of review time is indicated, then the fidelity module 270 sets a preparation fidelity factor value of "0" indicating that the teacher failed to prepare adequately for the lesson. Alternatively, user-provided historical implementation data can be used to generate the value for the preparation fidelity factor, such as based on a teacher log for the day preceding the lesson day including an indication that the teacher prepared for the following day's lesson. Other such fidelity factors include a group fidelity factor that provides an indication of whether the intervention group was formed according to, and continues to meet, predetermined group formation criteria, such as group size, common skill levels of group members, or the like, and a progress fidelity factor that provides an indication that the teacher advances the topics and/or difficulty of the activities of the lessons according to predetermined curriculum progression criteria.

Figure 12:
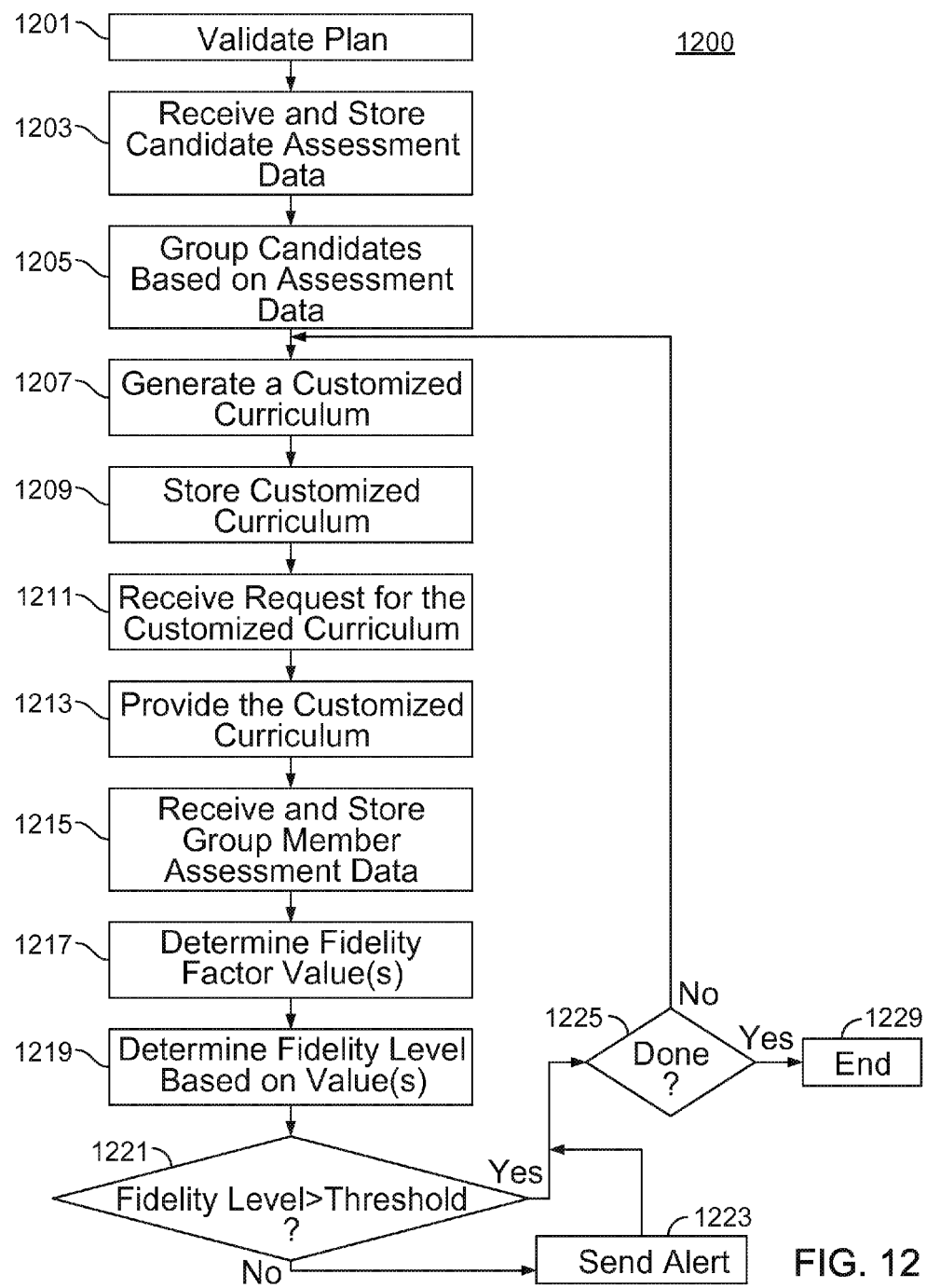
FIG. 12 is an illustration of an example flow chart of a process for monitoring implementation of a curriculum.

Referring now to FIG. 12, the system 200 can be used to perform a process 1200 for monitoring educational process fidelity. In one example, the process 1200 begins by verifying that an implementation plan is complete (1201). The implementation plan includes information relating to goals of the curriculum, including various performance metrics or milestones that should be achieved. The implementation plan can also include information regarding how the implementation of the curriculum should be monitored, including which fidelity factors are to be considered, how the selected fidelity factors are to be used to generate a fidelity level for the implementation of the curriculum, and what feedback and feed forward, if any, should be performed.

When the implementation plan has been verified, the fidelity module starts monitoring the implementation and automatically records usage data as the system 200 is used. For example, the teacher can use the wireless device 210 to time and report the duration of a lesson and the particular activities presented during the lesson. Additionally, as the teacher interacts with the system 200, such as to send updated assessment information, review the next lesson, and/or make notes regarding a past lesson, historical usage data and/or user-provided historical implementation data can be recorded.

As discussed above with reference to FIG. 4, the teacher inputs initial assessment data for each of the students of a class to the host 220, and an indication of the time when the assessment data was input to the system 200 is automatically stored (1203). The host 220 selects groups for delivery of customized curricula and indications regarding the group composition are stored for determining whether they individually and collectively conform to the implementation plan (1205). Based on the assessment data for the group members, such as the most recent assessment data, the customized curriculum is created (1207) and stored (1209). When a request for the customized curriculum is received from the teacher (1211), the customized curriculum is provided to the teacher (1213). In some implementations, an indication that the customized curriculum has been reviewed is stored (and potentially an indication of the duration of the review, e.g., if the curriculum is reviewed on a display). The teacher then delivers the lessons of the customized curriculum according to the plan, such as by providing one lesson of approximately thirty minutes duration each day for two weeks, totaling ten lessons. If available, historical system usage data and/or user-provided implementation data is stored during this time. At or near the end of the customized curriculum period, the teacher assesses the group members and sends updated assessment information to the host 220. When received, the group member assessment data is stored (1215).

At or near the end of each customized curriculum period, the fidelity module 270 determines current fidelity factor value(s) (1217) based on the accumulated data of system usage, user-provided data, and/or the current assessment data, such as described above. Then, using the fidelity factor values, the fidelity module 270 determines a fidelity level for the implementation of the processes (1219). The fidelity level is compared to a threshold value to determine whether the fidelity level exceeds the threshold value (1221).

If the fidelity level does not exceed the threshold value, then a fidelity alert message is generated and sent to one or more selected users of the system 200 (1223). For example, an e-mail message can automatically composed and sent to an e-mail address of the teacher. Alternatively, the system 200 can deliver a message to an inbox of an account of the teacher. If the fidelity level exceeds the threshold value, then a determination is made regarding whether the process 1200 is done (1225), such as where a school year or semester is completed, or where all of the group members have achieved a goal of the education processes. If the process 1200 is not done, another customized curriculum is generated based on the new member assessment data, and the process continues as described above until the process 1200 is done, and the process 1200 ends (1299).

As an example, values for the following fidelity factors are determined: (1) a new curriculum delay time fidelity factor based on an amount of time elapsed since the first set of instructional materials was provided to the teacher until receiving the request for the second set of instructional materials from the teacher, (2) a lesson delivery time fidelity factor based on an amount of time the first set of instructional materials were administered to one or more members of the group, (3) an assessment delay time fidelity factor based on an amount of time elapsed since the first set of instructional materials was provided to the teacher until receiving the second assessments of the skill level of the group members, and (4) a progress fidelity factor based on a determined progress of one or more of the group members, determined based on the received second, or subsequent, assessments. Based on the determined values of the fidelity factors, the fidelity level can be determined.

In some implementations, different fidelity factors can be used in addition to, or instead of, one or more of the fidelity factors discussed above. For example, a value for a lesson delivery start time fidelity factor can be determined based on the local time at which delivery of the lesson commenced. If the lesson delivery start time, such as a time captured by an electronic device used in lesson delivery, indicates that the lesson was delivered outside of an expected window of time, such as outside of school hours of operation, the determined value for the lesson delivery start time fidelity factor can indicate that the lesson was likely not delivered to the intended students, and/or that the delivery of the lesson was irregular. Similarly, a lesson delivery completeness fidelity factor can be determined based on a number elements of a lesson accessed on an electronic device during a lesson, such as a number of activities accessed or a number of inputs entered during lesson delivery. As another example, an interaction fidelity factor can be determined based on the presence or absence, and/or the content, of recorded interactions with students, such as audio and/or video recordings, photographs, or other records captured during delivery of the lesson.

In some implementations, the alerts can also include suggestions or recommendations regarding modification of the implementation to align the modification with the plan. For example, if the assessment data for a student indicates that the student is not progressing as expect or desired, the alert can include a suggestion to select the student more frequently for participation in practice elements of the activities of the curriculum, and/or for supplemental instruction. Additionally, the alerts can include reminders regarding upcoming milestones of the curriculum, such as scheduled assessment times, or upcoming lessons. The reminders can include historical information, if desired. For example, if a teacher notes in the system 200 that a student struggled with a particular activity, a reminder message for a lesson that includes the same activity, or an activity teaching the same skill or knowledge, can include a reminder that the student struggled with the activity in the past, and may require special attention, instruction, or increased participation. Similarly, a reminder message may include information regarding past lessons so that the teacher can refer back for continuity, such as where vocabulary words were used in a previous lesson and the reminder includes a list of the vocabulary words from the previous lesson(s).

In some implementations, the alerts can be tiered, and the alert tier can be raised or lowered based on historical data. For example, if the teacher has previously missed a lesson, a subsequent missed lesson (or missed assessment) may result in an alert being sent to a site or school administrator, or to a principal, instead of, or in addition to, an alert to the teacher. The alert tier may be lowered after a predetermined period of proper implementation of the curriculum, such as where the teacher successfully delivers a predetermined number of lessons without requiring an alert.

The system 200 can also automatically provide progress reports to the teacher regarding each group or all groups. The reports can provide a snapshot of the progress of the implementation, target implementation characteristic, such as the acceptable ranges and values included in the implementation plan, the progress of the students, the progress goals, indications of past implementation problems, and/or recommendations regarding modification of the implementation. Progress reports can also be sent to site administrators and/or education system administrators, such as superintendents. The progress reports can include aggregated information, such as average performance of teachers, students, or schools in any desired breakdown. In some implementations, the reports can also be generated on demand, such as in response to a request.

A number of implementations have been described. Nevertheless, it will be understood that various modifications may be made. For example, when the teacher uses the system 200 to form or reform a group, the fidelity module 270 can verify that each group has no more and no fewer students than permitted and that there are no more and no fewer groups than permitted. Additionally, the fidelity module 270 can verify that the students in each group individually and collectively meet selected criteria for group selection included in the implementation plan, such as by verifying that all students in each group have a common skill or knowledge deficiency. If one or more of the groups is not aligned with the implementation plan, an alert message is automatically provided to the teacher, and the teacher is prompted to correct the group formation, or to allow the groups to be reformed automatically.

Additionally, while the analysis of the stored data is described above as periodic at the end of each customized curriculum period, the stored data can continually be analyzed and compared to the implementation plan to verify that the implementation of the processes aligns with the plan. For example, the frequency of delivery of the curriculum lessons is compared to an acceptable frequency range. In one example, if a lesson is missed, an alert message is sent to the teacher regarding the missed lesson. Additionally, the frequency of assessments, the frequency of curriculum creation, the quality of lesson delivery, and the progress rate of the students, among others, can be monitored in this way, and reports can be automatically generated to notify the teacher, or other user, of any deviation of the implementation of the curriculum from ranges or values that are indicated as acceptable in the implementation plan.

Also, while the process 1200 for monitoring educational process fidelity can be adapted to account for different educational processes. For example, the process 1200 can be implemented for the educational process illustrated in and described with reference to FIG. 4, including the regrouping functions, and the functions associated with identifying and supplementing the customized curriculum for outlier group members.

Furthermore, while remediation of skill or knowledge deficiency has been described, the systems and processes described herein can be used for delivery of curricula for any purpose, including for presenting advanced curricula to students or other candidates who perform approximately at the anticipated or desired level, or who perform above the anticipated or desired level (e.g., TAG students). Thus, a traditional textbook curriculum could be replaced entirely with customized periodic curricula designed specifically for a particular class, based on assessment information for the students in the class. Additionally, the computer system 200, including the wireless device 210, or other computer system, can optionally present activities to students in electronic form, either automatically or interactively. Accordingly, other implementations are within the scope of the following claims.

What is claimed is:

1. A system for ensuring fidelity to a model implementation of an educational process, the system comprising:
   one or more processing devices;
   one or more communication devices; and
   one or more storage devices storing instructions, the one or more processing devices configured to execute the instructions to cause the one or more processing devices to:
   perform one or more operations included in an actual implementation of the educational process that correspond to operations in the model implementation of the educational process, the model implementation including at least the following operations:
      receiving, via the one or more communication devices, first assessments of a skill level of candidates for at least one skill,
      grouping a subset of the candidates into an instructional group based, at least in part, on the first assessments,
      generating a first set of instructional materials for teaching the at least one skill,
      storing the first set of instructional materials on the one or more storage devices,
      sending, by an instructor via the one or more communication devices, a request for the first set of instructional materials to the one or more processing devices,
      receiving, via the one or more communication devices, the request for the first set of instructional materials from the instructor,
      providing, via the one or more communication devices, the first set of instructional materials to the instructor,
      teaching, by the instructor, the instructional group using the first set of instructional materials,
      receiving, via the one or more communication devices, second assessments of the skill level of instructional group members for the at least one skill, generating a second set of instructional materials for teaching the at least one skill, storing the second set of instructional materials on the one or more storage devices, sending, by the instructor via the one or more communication devices, a request for the second set of instructional materials to the one or more processing devices, receiving, via the one or more communication devices, the request for the second set of instructional materials from the instructor, providing, via the one or more communication devices, the second set of instructional materials to the instructor, and teaching, by the instructor, the instructional group using the second set of instructional materials;

determine values for two or more fidelity factors, the fidelity factors relating to a degree of conformity between operations of the model implementation of the educational process intended to be performed by the instructor and the corresponding operations, performed by the instructor, of the actual implementation of the educational process, wherein the values for the fidelity factors are determined based on two or more of the following:

an amount of time elapsed since the first set of instructional materials was provided to the instructor until receiving the request for the second set of instructional materials from the instructor, an amount of time the first set of instructional materials was taught by the instructor to one or more members of the instructional group, an amount of time elapsed since the first set of instructional materials was provided to the instructor until receiving the second assessments of the skill level of instructional group members for the at least one skill, or a progress of one or more of the instructional group members in acquiring the at least one skill determined based on the received second assessments;

determine a fidelity level based on the values for the two or more determined fidelity factors;

compare the fidelity level to a threshold level; and generate a fidelity alert message regarding the degree of conformity between operations of the model implementation of operations of the educational process intended to be performed by the instructor and the corresponding operations, performed by the instructor, of the actual implementation of one or more operations of the educational process based on the comparison of the fidelity level to the threshold level.

2. The system of claim 1 wherein the instructions include instructions that, when executed by the one or more processing devices, cause the one or more processing devices to transmit the alert message to one or more of the instructor, an administrator, or a parent.

3. The system of claim 1 wherein the alert message includes one or more recommendations regarding modification of the actual implementation of the education process to align the actual implementation to the model implementation.

4. The system of claim 1 wherein the alert message provides feedback regarding adequate and inadequate aspects of the actual implementation of the educational process.

5. The system of claim 1 wherein the alert message includes a reminder regarding upcoming milestones related to the first and second sets of instructional materials.

6. The system of claim 1 wherein the subset of candidates are grouped such that members of the instructional group have similar skill levels with respect to the at least one skill.

7. The system of claim 6 wherein the similar skill levels of the members of the instructional group includes a deficiency in the at least one skill.

8. The system of claim 1, wherein determining values for two or more fidelity factors includes determining a value for a fidelity factor that relates to at least one of the request for the first set of instructional materials, the receipt of the second assessments, or the request for the second set of instructional materials.

9. The system of claim 1, wherein determining values for two or more fidelity factors includes determining a fidelity factor that relates to at least one of a lesson delivery start time, a lesson delivery completeness, or a student interaction during a lesson.

10. The system of claim 1, wherein at least one of the values of the two or more fidelity factors is determined based on the amount of time elapsed since the first set of instructional materials was provided to the instructor until receiving the request for the second set of instructional materials from the instructor.

11. The system of claim 1, wherein at least one of the values of the two or more fidelity factors is determined based on the amount of time the first set of instructional materials was taught by the instructor to one or more members of the instructional group.

12. The system of claim 1, wherein at least one of the values of the two or more fidelity factors is determined based on the amount of time elapsed since the first set of instructional materials was provided to the instructor until receiving the second assessments of the skill level of instructional group members for the at least one skill.

13. The system of claim 1, wherein at least one of the values of the two or more fidelity factors is determined based on the progress of one or more of the instructional group members in acquiring the at least one skill determined based on the received second assessments.

14. The system of claim 1, wherein the fidelity factors are determined based on the following:

the amount of time elapsed since the first set of instructional materials was provided to the instructor until receiving the request for the second set of instructional materials from the instructor, the amount of time the first set of instructional materials was taught by the instructor to one or more members of the instructional group, the amount of time elapsed since the first set of instructional materials was provided to the instructor until receiving the second assessments of the skill level of instructional group members for the at least one skill, and the progress of one or more of the instructional group members in acquiring the at least one skill determined based on the received second assessments.

15. The system of claim 1, wherein the instructions further cause the one or more processing devices to:

verify completeness of an implementation plan including information regarding (i) goals of the educational process, including various performance metrics or milestones that should be achieved, (ii) how the actual implementation of the educational process should be monitored, (iii) the fidelity factors to be considered in determining the fidelity level, and (iv) how the identified fidelity factors are to be used to determine the fidelity level of the actual implementation, wherein (i) performing one or more operations included in an actual implementation of the educational process, (ii) determining values for two or more fidelity factors, and (iii) determining a fidelity level based on the determined values of the two or more fidelity factors, are based on the implementation plan.

16. A system for ensuring fidelity to a model implementation of an educational process, the system comprising:
one or more processing devices;
one or more communication devices; and
one or more storage devices storing instructions, the one or more processing devices configured to execute the instructions to cause the one or more processing devices to:
monitor fidelity of an actual implementation of an educational process by an instructor, wherein monitoring the fidelity includes:
generating two or more fidelity factor values that relate to a degree of conformity between the model implementation of the educational process and an aspect of the actual implementation of the educational process by the instructor, wherein the two or more fidelity factor values are determined based on two or more of the following:
an amount of time elapsed since a first set of instructional materials was provided to an instructor until receiving a request for a second set of instructional materials from the instructor,
an amount of time the first set of instructional materials was taught by the instructor to one or more members of an instructional group,
an amount of time elapsed since the first set of instructional materials was provided to the instructor until receiving second assessments of a skill level of instructional group members for at least one skill, or
a progress of one or more of the instructional group members in acquiring the at least one skill determined based on the received second assessments, and
comparing the two or more fidelity factor values with one or more predetermined threshold values; and
generate an alert message when the comparison indicates a deviation in the actual implementation of the educational process compared to the model implementation of the educational process that exceeds the one or more predetermined threshold values, the alert message including at least one of information regarding the deviation or a recommendation or instruction for an action that can be taken to remedy the deviation.

17. The system of claim 16, wherein the two or more fidelity factor values relate to at least one of a lesson delivery start time, a lesson delivery completeness, or a student interaction during a lesson.

18. A computer-implemented method for ensuring fidelity to a model implementation of an educational process, the method comprising:
executing one or more instructions that, when executed by one or more processing devices, cause the one or more processing devices to:
perform one or more operations included in an actual implementation of the educational process that correspond to operations in the model implementation of the educational process, the model implementation including at least the following operations:
receiving, via the one or more communication devices, first assessments of a skill level of candidates for at least one skill,
grouping a subset of the candidates into an instructional group based, at least in part, on the first assessments,
generating a first set of instructional materials for teaching the at least one skill,
storing the first set of instructional materials on the one or more storage devices,
sending, by an instructor via the one or more communication devices, a request for the first set of instructional materials to the one or more processing devices,
receiving, via the one or more communication devices, the request for the first set of instructional materials from the instructor,
providing, via the one or more communication devices, the first set of instructional materials to the instructor,
teaching, by the instructor, the instructional group using the first set of instructional materials,
receiving, via the one or more communication devices, second assessments of the skill level of instructional group members for the at least one skill,
generating a second set of instructional materials for teaching the at least one skill,
storing the second set of instructional materials on the one or more storage devices,
sending, by the instructor via the one or more communication devices, a request for the second set of instructional materials to the one or more processing devices,
receiving, via the one or more communication devices, the request for the second set of instructional materials from the instructor,
providing, via the one or more communication devices, the second set of instructional materials to the instructor, and
teaching, by the instructor, the instructional group using the second set of instructional materials;
determine values for two or more fidelity factors, the fidelity factors relating to a degree of conformity between operations of the model implementation of the educational process intended to be performed by the instructor and the corresponding operations, performed by the instructor, of the actual implementation of the educational process, wherein the values for the fidelity factors are determined based on two or more of the following:
an amount of time elapsed since the first set of instructional materials was provided to the instructor until receiving the request for the second set of instructional materials from the instructor,
an amount of time the first set of instructional materials was taught by the instructor to one or more members of the instructional group,
an amount of time elapsed since the first set of instructional materials was provided to the instructor until receiving the second assessments of the skill level of instructional group members for the at least one skill, or
a progress of one or more of the instructional group members in acquiring the at least one skill determined based on the received second assessments;

determine a fidelity level based on the values for the two or more determined fidelity factors;

compare the fidelity level to a threshold level; and generate a fidelity alert message regarding the degree of conformity between operations of the model implementation of operations of the educational process intended to be performed by the instructor and the corresponding operations, performed by the instructor, of the actual implementation of one or more operations of the educational process based on the comparison of the fidelity level to the threshold level.

19. The method of claim 18 wherein the instructions include instructions that, when executed by the one or more processing devices, cause the one or more processing devices to transmit the alert message to one or more of the instructor, an administrator, or a parent.

20. The method of claim 18 wherein the alert message includes one or more recommendations regarding modification of the actual implementation of the educational process to align the actual implementation of the educational process with the model implementation of the educational process.

21. The method of claim 18 wherein the alert message provides feedback regarding adequate and inadequate aspects of the actual implementation of the educational process.

22. The method of claim 18 wherein the alert message includes a reminder regarding upcoming milestones related to the first and second sets of instructional materials.

23. The method of claim 18 wherein the subset of candidates are grouped such that members of the instructional group have similar skill levels with respect to the at least one skill.

24. The method of claim 23 wherein the similar skill levels of the members of the instructional group includes a deficiency in the at least one skill.

25. The method of claim 18, wherein determining values for two or more fidelity factors includes determining a value for a fidelity factor that relates to at least one of the request for the first set of instructional materials, the receipt of the second assessments, or the request for the second set of instructional materials.

26. The method of claim 18, wherein determining values for two or more fidelity factors additionally includes determining a fidelity factor that relates to at least one of a lesson delivery start time, a lesson delivery completeness, or a student interaction during a lesson.

27. A computer-implemented method for ensuring fidelity of instructional materials, the method comprising:

executing one or more instructions that, when executed by one or more processing devices, cause the one or more processing devices to:

monitor fidelity of an actual implementation of an educational process by an instructor, wherein monitoring the fidelity includes:

generating two or more fidelity factor values that relate to a degree of conformity between the model implementation of the educational process and an aspect of the actual implementation of the educational process by the instructor, wherein the two or more fidelity factor values are determined based on two or more of the following:

an amount of time elapsed since a first set of instructional materials was provided to an instructor until receiving a request for a second set of instructional materials from the instructor, an amount of time the first set of instructional materials was taught by the instructor to one or more members of an instructional group, an amount of time elapsed since the first set of instructional materials was provided to the instructor until receiving second assessments of a skill level of instructional group members for at least one skill, or a progress of one or more of the instructional group members in acquiring the at least one skill determined based on the received second assessments, and comparing the two or more fidelity factor values with one or more predetermined threshold values; and generate an alert message when the comparison indicates a deviation in the actual implementation of the educational process compared to the model implementation of the educational process that exceeds the one or more predetermined threshold values, the alert message including at least one of information regarding the deviation or a recommendation or instruction for an action that can be taken to remedy the deviation.

28. The method of claim 27, wherein the one or more fidelity factor values relate at least one of a lesson delivery start time, a lesson delivery completeness, or a student interaction during a lesson.

* * * * *